(12) United States Patent
Konoura et al.

(10) Patent No.: US 12,047,451 B2
(45) Date of Patent: Jul. 23, 2024

(54) IOT SYSTEM AND DATA COLLECTION CONTROL METHOD

(71) Applicant: Hitachi, Ltd., Tokyo (JP)

(72) Inventors: Hiroaki Konoura, Tokyo (JP); Masafumi Kinoshita, Tokyo (JP); Yu Nakata, Tokyo (JP); Yuta Sekiguchi, Tokyo (JP); Sota Uehara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/911,396

(22) PCT Filed: Aug. 19, 2021

(86) PCT No.: PCT/JP2021/030407
§ 371 (c)(1),
(2) Date: Sep. 13, 2022

(87) PCT Pub. No.: WO2022/091533
PCT Pub. Date: May 5, 2022

(65) Prior Publication Data
US 2023/0099545 A1 Mar. 30, 2023

(30) Foreign Application Priority Data

Oct. 29, 2020 (JP) ................................ 2020-181098

(51) Int. Cl.
*H04L 67/12* (2022.01)
*G16Y 10/75* (2020.01)

(52) U.S. Cl.
CPC .............. *H04L 67/12* (2013.01); *G16Y 10/75* (2020.01)

(58) Field of Classification Search
CPC ......... G16Y 10/75; H04L 67/12; H04L 41/08; H04L 67/02; H04L 67/10; H04L 67/125; G06F 13/00
See application file for complete search history.

(56) References Cited

U.S. PATENT DOCUMENTS 11,290,538 B2* 3/2022 Chau ..................... H04L 43/065
2011/0164511 A1* 7/2011 Poon ..................... H04W 24/06
370/252

(Continued)

FOREIGN PATENT DOCUMENTS

JP 2013516907 A 5/2013
JP 2014041493 A 3/2014
(Continued)

OTHER PUBLICATIONS

International Search Report mailed on Nov. 16, 2021, from International Application No. PCT/JP2021/030407, 2 pages.
(Continued)

*Primary Examiner* — Jason D Recek
(74) *Attorney, Agent, or Firm* — Procopio, Cory, Hargreaves & Savitch LLP

(57) ABSTRACT

It is provided an IoT system, comprising: a communication device in which an identification module for controlling a communication requirement is installed, and which is configured to communicate to/from a cloud server; an asset which is connected to the communication device; and a control server which is configured to manage setting of the communication between the communication device and the cloud server, wherein the control server is configured to: manage a relationship between the identification module and the communication device and a relationship between the communication device and the asset; and set the communication between the communication device and the cloud server in order to transfer information from the asset to the cloud server.

8 Claims, 22 Drawing Sheets

(56) References Cited

U.S. PATENT DOCUMENTS

| | | | |
|---|---|---|---|
| 2014/0059164 A1* | 2/2014 | Saito | H04L 67/306 709/217 |
| 2015/0120010 A1 | 4/2015 | Hashimoto et al. | |
| 2016/0335731 A1* | 11/2016 | Hall | G06Q 10/10 |
| 2016/0379165 A1* | 12/2016 | Moakley | G06Q 10/0833 705/333 |
| 2019/0058711 A1* | 2/2019 | Zhu | H04L 67/306 |
| 2019/0166088 A1 | 5/2019 | Krochik et al. | |

FOREIGN PATENT DOCUMENTS

| | | |
|---|---|---|
| JP | 2015087852 A | 5/2015 |
| WO | 2011084945 A1 | 7/2011 |

OTHER PUBLICATIONS

Examination Report received in co-pending AU Application No. 2021370143, dated May 29, 2023, in 5 pages.

\* cited by examiner

| SIM ID (3241) | MNO (3242) | Tenant ID (3243) | Profile (3244) | Registered user ID (3245) | Registered date (3246) | ... |
|---|---|---|---|---|---|---|
| s0000 | Carrier-A | XXX Co. | (Object) | 700001 | 1601989090 | |
| s0001 | Carrier-A | XXX Co. | (Object) | 700002 | 1602010010 | |
| s0002 | Carrier-A | XXX Co. | (Object) | 700002 | 1602219583 | |

SIM INFORMATION 324

*Fig. 5*

| SIM ID (3251) | Device ID (3252) | Registered user ID (3253) | Registered date (3254) | ... |
|---|---|---|---|---|
| s0000 | d0000 | 700001 | 1602500101 | |
| s0001 | d0001 | 700002 | 1602798573 | |
| s0002 | d0002 | 700002 | 1602912301 | |

SIM-DEVICE ASSOCIATION INFORMATION 325

*Fig. 6*

| Device ID | Tenant ID | Device group | Device name | Device certification | Registered user ID | Registered date | ... |
|---|---|---|---|---|---|---|---|
| d0000 | XXX Co. | dev-group-A | DEVYYY0 | (Object) | 700001 | 1602500101 | |
| d0001 | XXX Co. | dev-group-A | DEVYYY1 | (Object) | 700002 | 1602798573 | |
| d0002 | XXX Co. | dev-group-A | DEVYYY2 | (Object) | 700002 | 1602912301 | |

DEVICE INFORMATION 333

Fig. 7

| Asset ID (3431) | Asset group (3432) | Asset serial (3433) | Asset name (3434) | Asset type ID (3435) | ... |
|---|---|---|---|---|---|
| a0000 | asset-A | AS09293841 | compressor-A | type-X | |
| a0001 | asset-A | AS09293842 | compressor-B | type-X | |
| a0002 | asset-B | AS00010142 | mini-comp-A | type-Y | |

ASSET INFORMATION 343

*Fig. 8*

| Asset type ID (3441) | Tenant ID (3442) | Asset attributes (3443) | ... |
|---|---|---|---|
| type-X | XXX Co. | (Object) | |
| type-Y | XXX Co. | (Object) | |

ASSET TYPE INFORMATION 344

*Fig. 9*

| Device ID (3451) | Asset ID (3452) | Registered user ID (3453) | Registration date (3454) | ... |
|---|---|---|---|---|
| d0000 | a0000 | 700001 | 1602519137 | |
| d0001 | a0001 | 700002 | 1602848309 | |
| d0002 | a0002 | 700002 | 1602950013 | |

DEVICE-ASSET ASSOCIATION INFORMATION 345

*Fig. 10*

SEQUENCE FROM LINE CONTRACT TO LINE CONNECTING

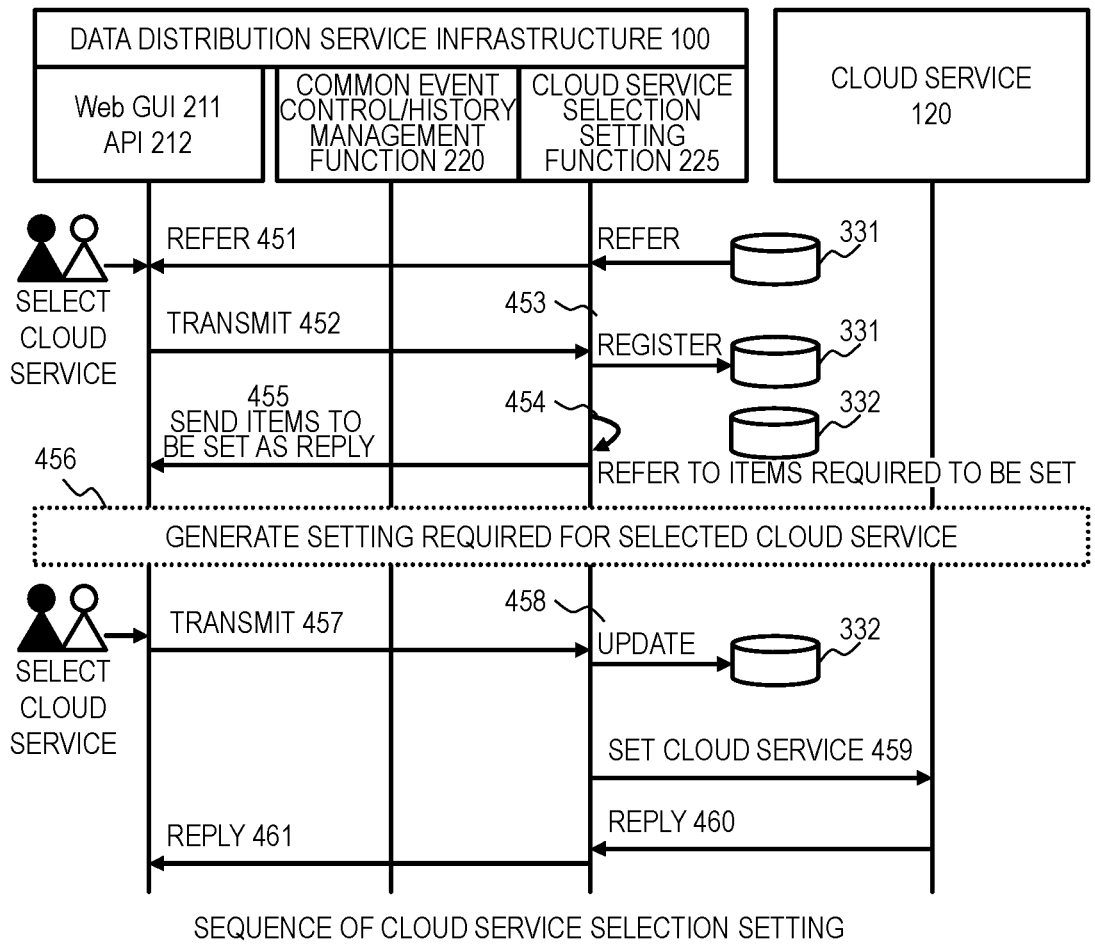
Fig. 14
SEQUENCE OF CLOUD SERVICE SELECTION SETTING
 INFRASTRUCTURE-SIDE ADMINISTRATOR
 TENANT-SIDE USER

| 801 | 802 | 803 | 804 | 805 | 806 | 800 |

| | | | | Column select | Search word | |
|---|---|---|---|---|---|---|
| Action | Display | ↻ | 🔍 | Device ID ▽ | d* | |

| | Device ID ↑ | Device group ↑ | Device name ↑ | ... | SIM ID ↑ | Asset ID ↑ |
|---|---|---|---|---|---|---|
| ☑ | d0000 | dev-group-A | DEVYYY0 | | s0000 | a0000 |
| ☐ | d0001 | dev-group-A | DEVYYY1 | | s0001 | a0001 |
| ☐ | d0002 | dev-group-A | DEVYYY2 | | s0002 | a0002 |

| 901 | 902 | 903 | 904 | 905 | 906 | 900 |

| | | | | Column select | Search word | |
|---|---|---|---|---|---|---|
| Action | Display | ↻ | 🔍 | Asset Type ID ▽ | X-Type | |

| | Asset ID ↑ | Asset serial ↑ | Asset name ↑ | ... | Asset type ID ↑ | Device ID ↑ |
|---|---|---|---|---|---|---|
| ☑ | a0000 | AS09293841 | compressor-A | | X-type | d0000 |
| ☐ | a0001 | AS09293842 | compressor-B | | X-type | d0001 |

IOT SYSTEM AND DATA COLLECTION CONTROL METHOD

CLAIM OF PRIORITY

The present application claims priority from Japanese patent application JP 2020-181098 filed on Oct. 29, 2020, the content of which is hereby incorporated by reference into this application.

BACKGROUND OF THE INVENTION

This invention relates to an IoT system which controls data collection from assets (devices).

There is a need mainly from manufacturers which globally produce and deploy assets to collect and analyze data from the assets used over the world, to thereby link results of the analysis to improvement of business efficiency and business creation. Moreover, it is predicted that utilization of the data collected from the assets further progresses as a result of development of a high-capacity and high-speed data communication technology.

As the related art in this technical field, there is a technology as disclosed in JP 2015-87852 A. In JP 2015-87852 A, there is described an industrial machine management system including a terminal and an industrial machine management device. The terminal includes a transmission unit for transmitting management information for a user, which is set in accordance with an input from the user in regard to an industrial machine to be managed. The industrial machine management device includes a reception unit for receiving the management information for the user transmitted by the transmission unit, and a storage unit for storing the management information for the user received by the reception unit in association with individual identification information on the industrial machine to be managed.

SUMMARY OF THE INVENTION

In order to build a system which collects the IoT data from the assets all over the world, it is required to prepare and execute all of selection of communication lines in various places, selection of communication devices, association between the communication devices and the communication lines, device provisioning, acquisition and accumulation of the IoT data, and development of applications adapted thereto. A plurality of elements are related in the above-mentioned process. The elements include information on parameters of the communication line and the communication device, and information on the communication device and information on the asset. In particular, the parameters (communication requirements such as a bandwidth and a delay) of the communication line are controlled by setting a SIM installed in the communication device. There is thus required integrated management of elements including the SIM in addition to the communication device. There is demanded a service infrastructure capable of uniformly controlling those elements, and achieving, as a one-stop service, the selection of the communication lines to the collection of the IoT data.

The representative one of inventions disclosed in this application is outlined as follows. An IoT system, comprising: a communication device in which an identification module for controlling a communication requirement is installed, and which is configured to communicate to/from a cloud server; an asset which is connected to the communication device; and a control server which is configured to manage setting of the communication between the communication device and the cloud server wherein the control server is configured to: manage a relationship between the identification module and the communication device and a relationship between the communication device and the asset; and set the communication between the communication device and the cloud server in order to transfer information from the asset to the cloud server.

According to the at least one aspect of this invention, elements required for the IoT system can uniformly be controlled. Problems, configurations, and effects other than those described above become apparent from the following description of at least one embodiment.

BRIEF DESCRIPTION OF THE DRAWINGS

FIG. 5 is a diagram for illustrating a configuration example of the SIM information.

FIG. 6 is a diagram for illustrating a configuration example of the SIM-device association information.

FIG. 7 is a diagram for illustrating a configuration example of the device information.

FIG. 8 is a diagram for illustrating a configuration example of the asset information.

FIG. 9 is a diagram for illustrating a configuration example of the asset type information.

FIG. 10 is a diagram for illustrating a configuration example of the device-asset association information.

FIG. 14 is a sequence diagram of cloud service selection setting processing.

FIG. 25 is a diagram for illustrating an example of a device list screen.

FIG. 26 is a diagram for illustrating an example of an asset list screen.

DETAILED DESCRIPTION OF THE PREFERRED EMBODIMENTS

Figure 1:
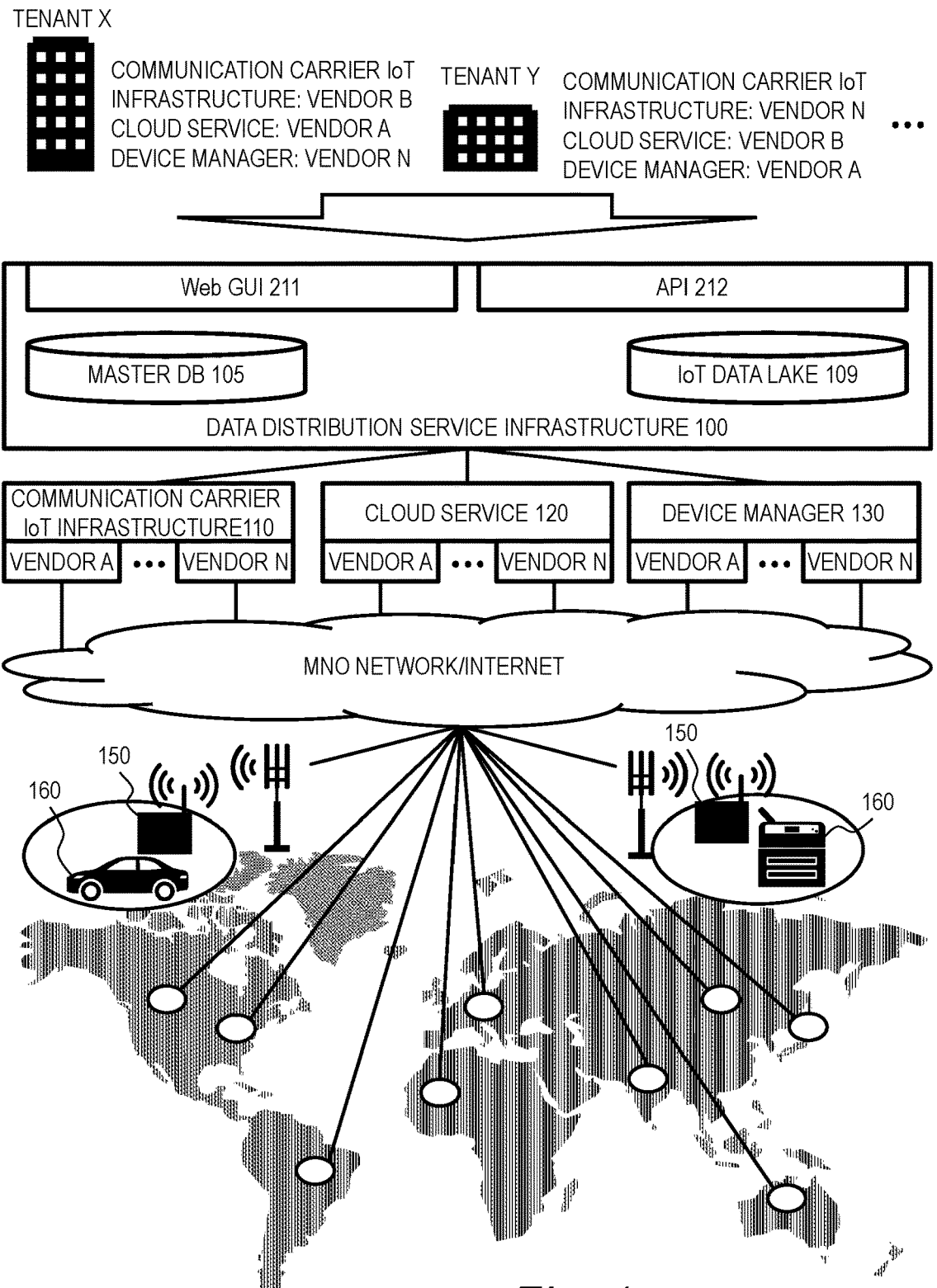
FIG. 1 is a diagram for illustrating a concept image of a data distribution service infrastructure.
Figure 2:
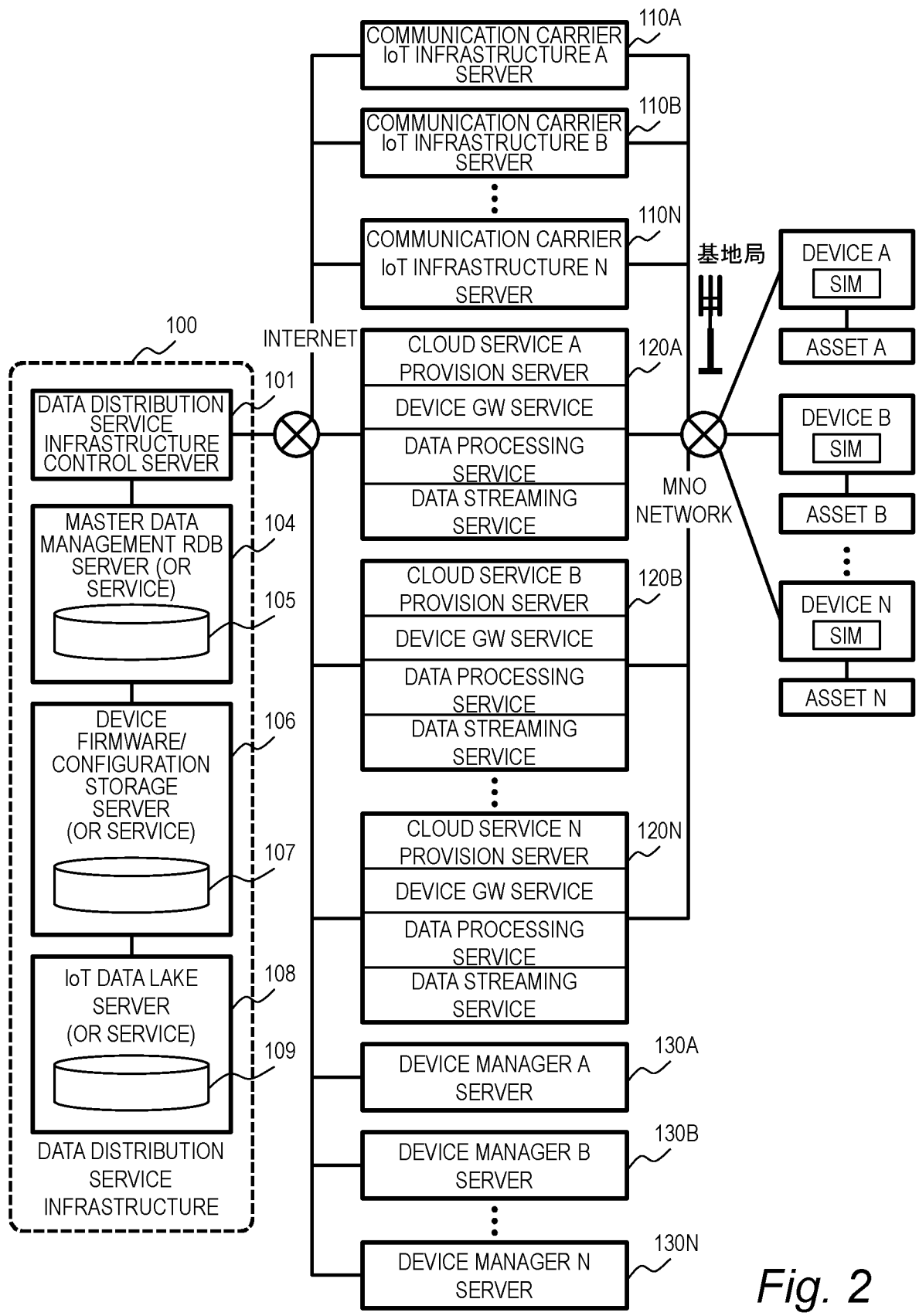
FIG. 2 is a diagram for illustrating an overall system configuration of the data distribution service infrastructure.

FIG. 1 is a diagram for illustrating a concept image of a data distribution service infrastructure 100. FIG. 2 is a diagram for illustrating an overall system configuration of the data distribution service infrastructure 100.

The data distribution service infrastructure 100 according to at least one embodiment of this invention is a platform for providing a one-stop service from connecting from the communication device 150 to a communication carrier line, through data collection from assets 160, to accumulation and visualization of the collected data, which enables each user such as a company to selectively use a communication carrier IoT infrastructure 110 provided by a communication carrier, a cloud service 120 provided by a cloud business operator, and a device manager server 130 which distributes a device manager implemented in a communication device 150.

The data distribution service infrastructure 100 includes a data distribution service infrastructure control server 101, a master data management RDB server 104, a device firmware/configuration file storage server 106, and an IoT data lake server 108. The servers 101, 104, 106, and 108 of the data distribution service infrastructure 100 are connected to one another through a LAN, for example.

The data distribution service infrastructure control server 101 controls operations of other servers 104, 106, and 108 of the data distribution service infrastructure 100. A configuration of the data distribution service infrastructure control server 101 is described later with reference to FIG. 3.

The master data management RDB server 104 manages a master management database 105 which stores data which is set to operate the data distribution service infrastructure 100. The data stored in the master management database 105 is described later with reference to FIG. 4.

The device firmware/configuration file storage server 106 manages a device firmware/configuration file database 107 which stores setting (for example, a communication profile and a device manager) for the communication devices 150.

The IoT data lake server 108 collects data from the asset 160, and stores the collected data in an IoT data lake 109.

The data distribution service infrastructure 100 is accessed by a Web graphical user interface (GUI) 211 and an application programming interface (API) 212 from a company.

Figure 3:
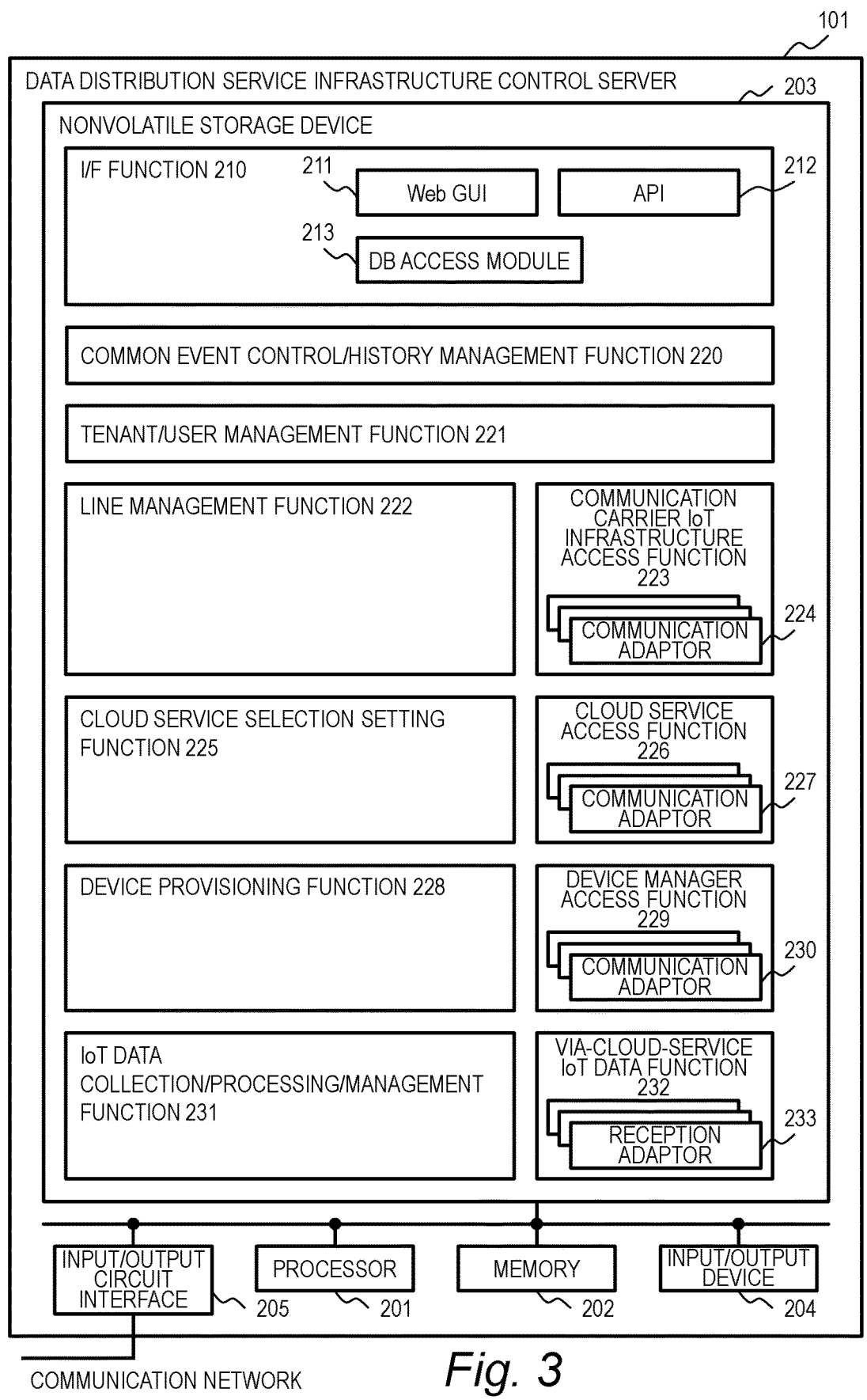
FIG. 3 is a diagram of the data distribution service infrastructure control server.

The data distribution service infrastructure 100 is connected to the communication carrier IoT infrastructures 110 provided by a plurality of vendors and the cloud services 120 provided by a plurality of vendors. The cloud service 120 provides, for each cloud service, a plurality of services such as a device GW service for receiving data transmitted by the communication device 150, a data processing service such as processing or decompressing data, and a data streaming service for collecting, buffering, and delivering data in real time. A plurality of cloud services 120 are different in service form, connecting method, input/output methods for data, and the like. As illustrated in FIG. 3, a communication adaptor 227 described later is thus used so that data suited to the used cloud service 120 can be transmitted and received. The communication carrier IoT infrastructure 110 and the cloud service 120 are connected to the communication device 150 through a network (for example, an MNO network and the Internet). The communication device 150 is generally connected to the Internet via a public wireless communication network (for example, 5G network). The communication device 150 is connected to the asset 160, and acquires required data from the asset 160. The communication device 150 and the asset 160 are connected to each other by wire (MODBUS, Ether CAT, and the like), but may be connected to each other wirelessly (Wi-Fi, Bluetooth, and the like). Moreover, the communication device 150 and the asset 160 are connected in a 1:1 manner, but may be connected in a 1:N manner. The data transmitted from the asset 160 is collected through the network and is processed by a server of the cloud service 120. After that, the data is accumulated in the IoT data lake 109. The data distribution service infrastructure control server 101 analyzes the accumulated data, estimates an operation state of the asset 160, and determines information on maintenance.

The asset 160 is a device (such as an automobile, an IT device, and a construction machine) being a source which provides the data to be collected by the data distribution service infrastructure 100.

Moreover, the data distribution service infrastructure 100 is connected to the device manager servers 130 to provide device managers provided from a plurality of vendors to the communication devices 150.

With this configuration, it is possible to facilitate and improve efficiency of line connecting of the communication devices 150, device provisioning, and cooperation among steps for the IoT data acquisition to provide a one-stop service through cooperation among device data, SIM data (profiles), asset data, and the like while communicating to/from the communication carrier IoT infrastructures 110, the cloud services 120, and the device manager servers 130.

Figure 15:
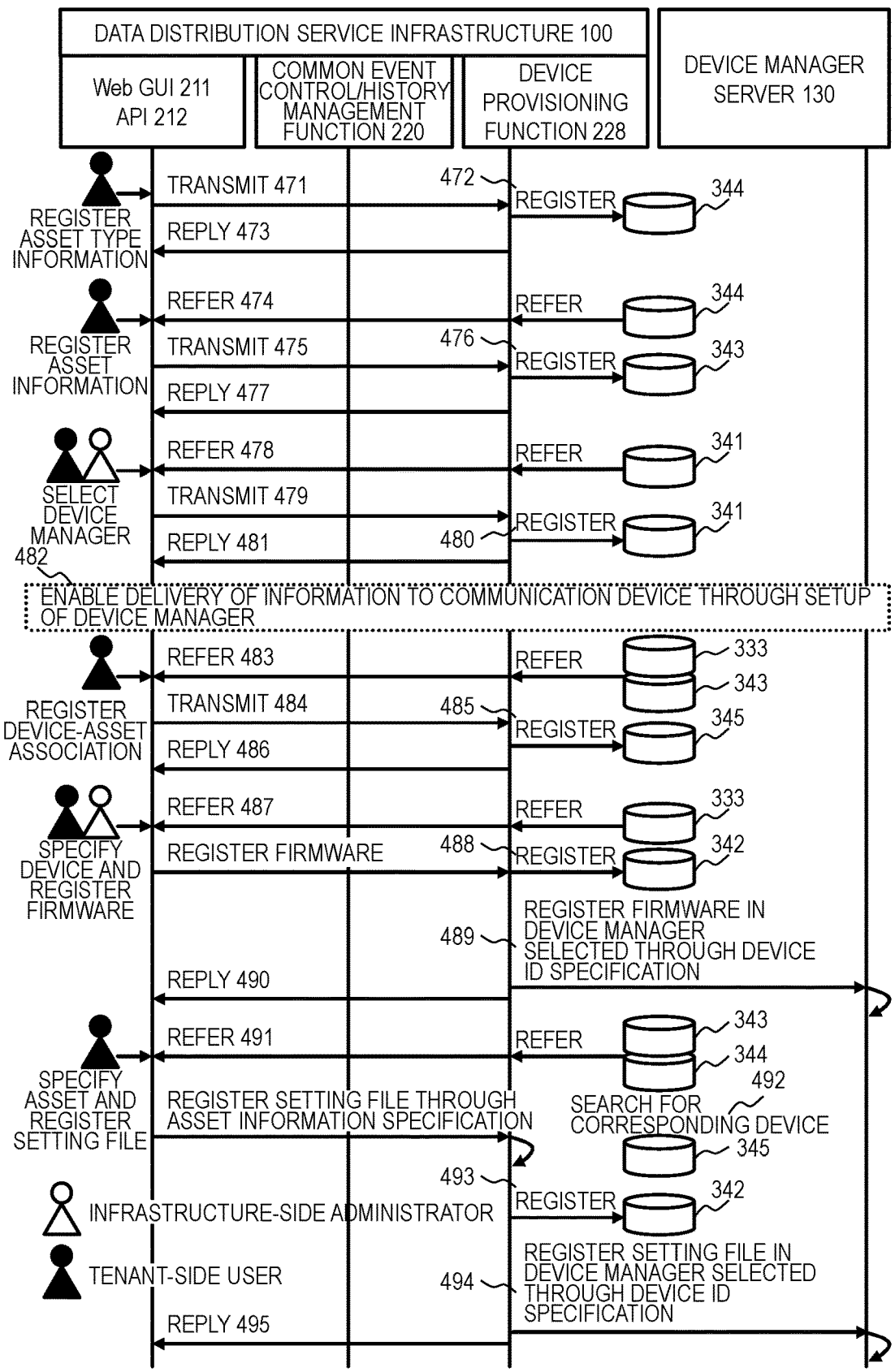
FIG. 15 is a sequence diagram of device provisioning processing.
Figure 21:
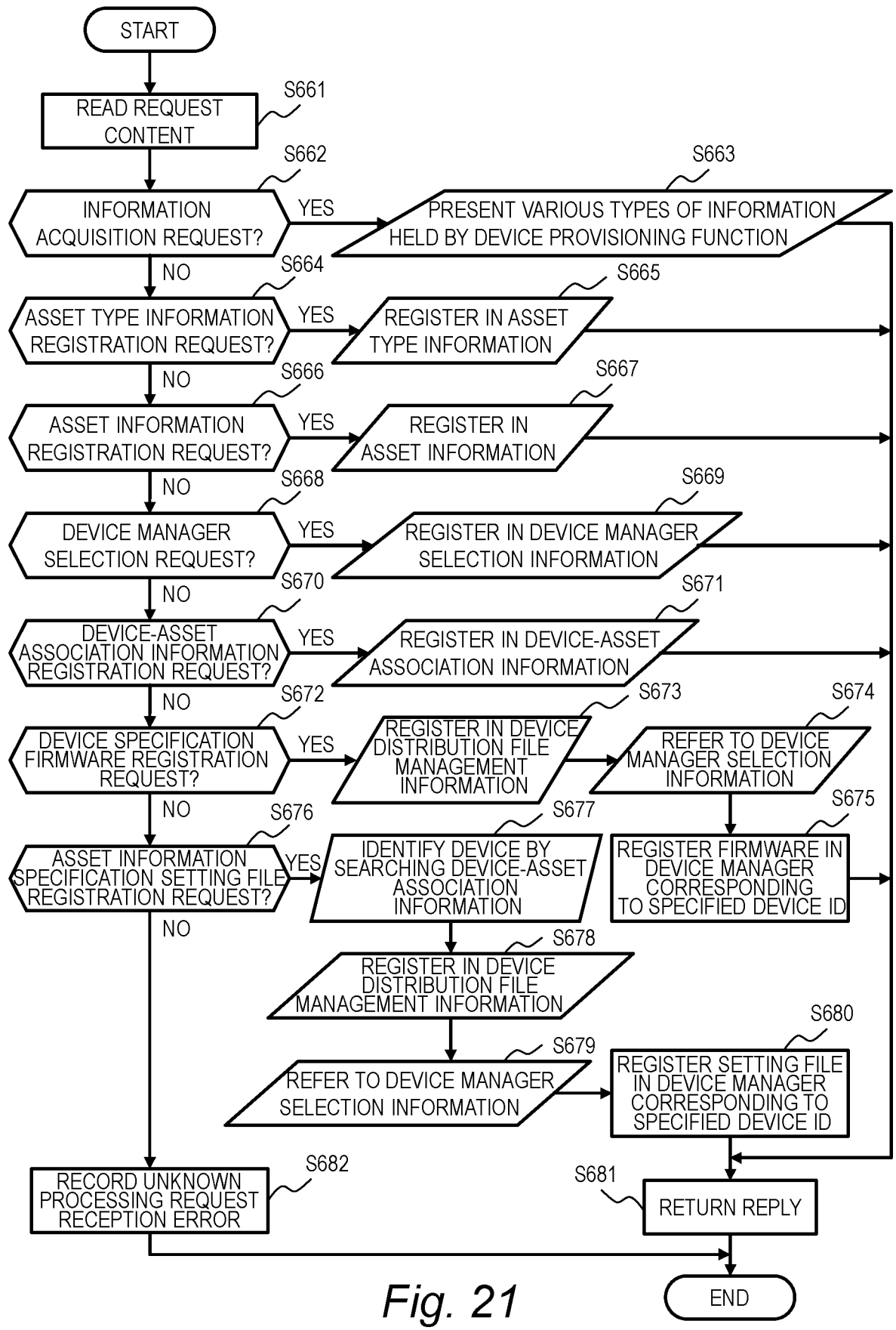
FIG. 21 is a flowchart of device provisioning processing.
Figure 24:
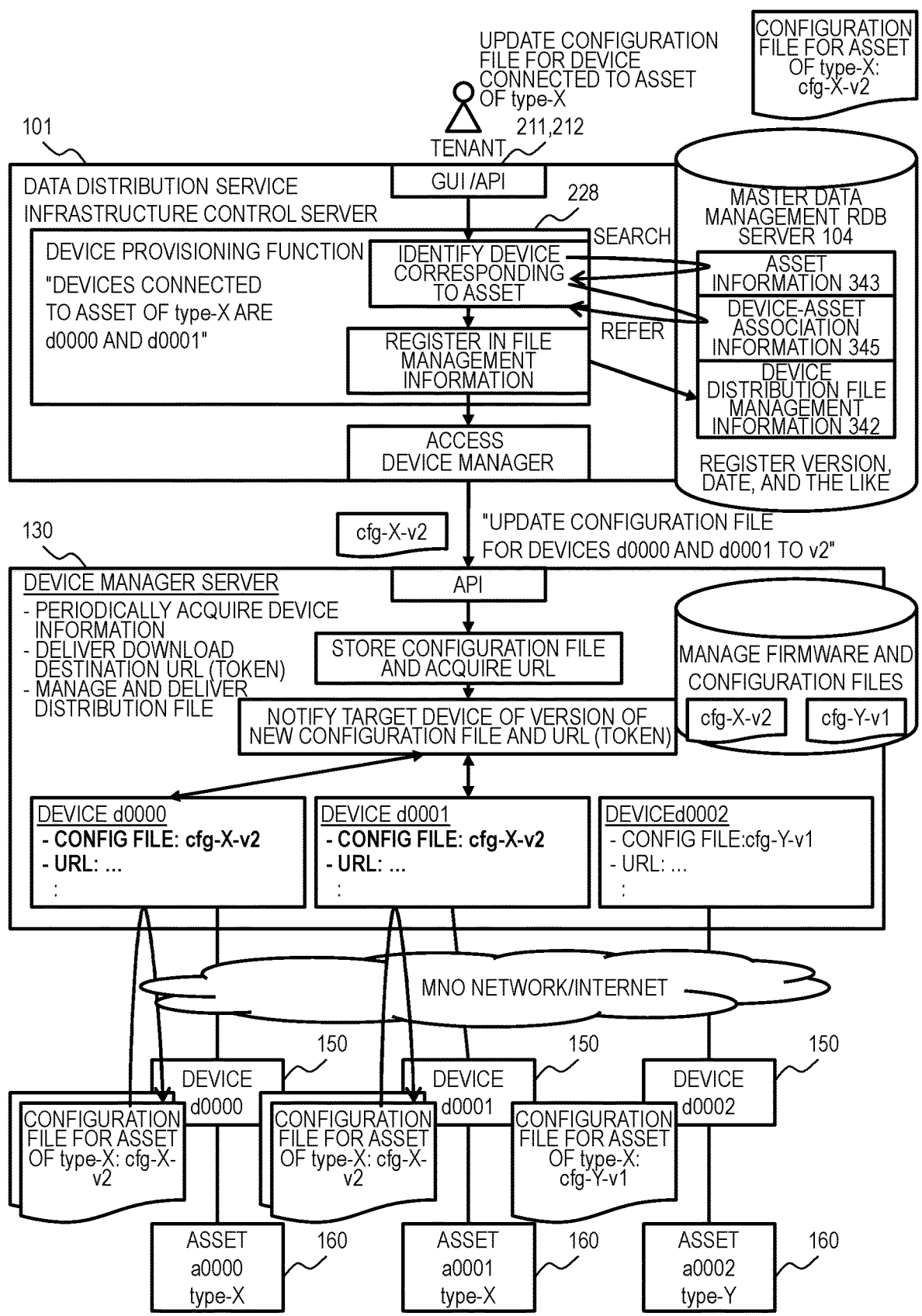
FIG. 24 is a diagram for illustrating distribution of a configuration file corresponding to the asset by the device manager server.

In FIG. 2, device firmware and configuration files are held by the device firmware/configuration file storage server 106 included in the data distribution service infrastructure 100, but may be held by the device manager server 130 as described in description given below (as illustrated in FIG. 15, FIG. 21, and FIG. 24, for example).

Figure 4:
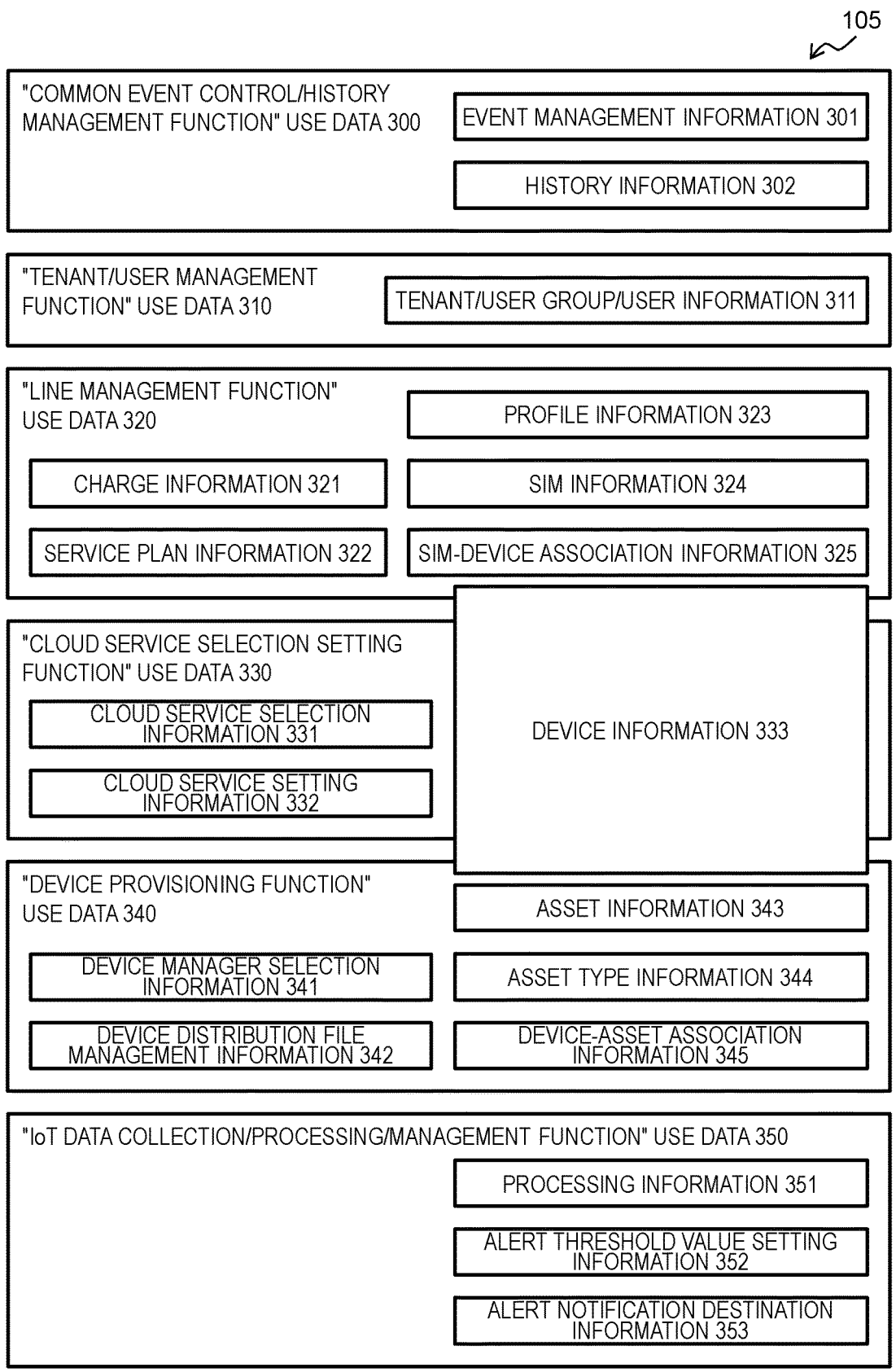
FIG. 4 is a diagram for illustrating a configuration of the master management database.

FIG. 3 is a block diagram of the data distribution service infrastructure control server 101. FIG. 4 is a diagram for illustrating a configuration of the master management database 105.

The data distribution service infrastructure control server 101 is formed of a computer including a processor 201, a memory 202, a nonvolatile storage device 203, an input/output device 204, and an input/output circuit interface 205.

The processor 201 executes programs stored in the memory 202. Specifically, the processor 201 executes the programs, to thereby implement an I/F function 210, a common event control/history management function 220, a tenant/user management function 221, a communication carrier IoT infrastructure access function 223, a cloud service selection setting function 225, a cloud service access function 226, a device provisioning function 228, a device manager access function 229, an IoT data collection/processing/management function 231, and a via-cloud-service IoT data function 232, which are described later. It should be noted that a part of the processing performed by the processor 201 executing the programs may be executed by a calculation device having another form (for example, a field programmable gate array (FPGA) or an application specific integrated circuit (ASIC) being hardware).

The memory 202 includes a ROM, which is a nonvolatile storage device, and a RAM, which is a volatile storage device. The ROM stores, for example, an invariant program (for example, a BIOS). The RAM is a dynamic random access memory (DRAM) or other such high-speed volatile storage device, and temporarily stores a program to be executed by the processor 201 and data to be used at a time of execution of the program.

The nonvolatile storage device 203 is, for example, a magnetic storage device (HDD), a flash memory (SSD), or other such large-capacity storage device, and stores the program to be executed by the processor 201 and the data to be used at the time of the execution of the program. In other words, the program is read out from the nonvolatile storage device 203, and loaded into the memory 202 to be executed by the processor 201.

The input/output device 204 is an interface device to which an input device such as a keyboard and a mouse and an output device such as a display device and a printer are connected. The input/output device 204 receives input from an operator, and outputs an execution result of the program in a form visually recognizable by the operator.

The input/output circuit interface 205 is a network interface device which controls communication to/from other devices (such as the master data management RDB server 104, the device firmware/configuration file storage server 106, and the IoT data lake server 108) in accordance with a predetermined protocol through the communication network. The program to be executed by the processor 201 is provided to the data distribution service infrastructure control server 101 through a removable medium (such as a CD-ROM and a flash memory) or the network, and is stored in the non-volatile storage device 203 being a non-transitory storage medium. Thus, the data distribution service infrastructure control server 101 preferably includes an interface which reads data from a removal medium.

The data distribution service infrastructure control server 101 is a computer system formed on physically one computer or formed on a plurality of computers that are configured logically or physically, and each functional block may operate on separate threads on the same computer, or may operate on a virtual machine built on a plurality of physical computer resources.

Next, with reference to FIG. 3 and FIG. 4, description is given of an overview of function blocks and data implemented in the data distribution service infrastructure control server 101.

The I/F function 210 includes the Web GUI 211, the API 212, and a DB access module 213. The Web GUI 211 is provided by a Web server. The API 212 can input and output data in accordance with predetermined rules. The DB access module 213 controls reading and writing of data from and to the master management database 105, the device firmware/configuration file database 107, and the IoT data lake 109. The I/F function 210 enables a user of a tenant and a system operated by the tenant to access the data distribution service infrastructure 100.

The common event control/history management function 220 refers to "common event control/history management function" use data 300 to control and manage an event common to each function block of the data distribution service infrastructure 100. Specifically, the common event control/history management function 220 refers to event management information 301, to thereby manage events occurring in the data distribution service infrastructure 100 and progresses of processing, and records, in history information 302, histories (logs) of the events occurring in the data distribution service infrastructure 100. The "common event control/history management function" use data 300 is accessed from the other function blocks 221 to 233 as required.

The tenant/user management function 221 refers to "tenant/user management function" use data 310, to thereby manage tenants and users which use the data distribution service infrastructure 100. Specifically, the tenant/user management function 221 refers to tenant/user group/user information 311 to associate tenants, user groups in the tenants, and users in the tenants with each other, to thereby manage attributes and authorities of the tenants, the user groups, and the users.

A line management function 222 refers to "line management function" use data 320 to control access to the communication carrier IoT infrastructures 110 provided by communication carriers. Specifically, the line management function 222 presents, to a tenant, an available service plan of the communication carrier from the service plan information 322, registers SIM information 324 shown in FIG. 5 corresponding to communication requirements (communication carrier, service plan, and the like) selected by the tenant, and registers SIM-device association information 325 shown in FIG. 6 corresponding to the SIM information 324. Moreover, the line management function 222 selects profile information 323 corresponding to the selected service plan, and provides the selected profile information 323 to the communication device 150.

The communication carrier IoT infrastructure access function 223 operates in linkage with the line management function 222, and refers to the "line management function" use data 320. The line management function 222 uses the communication adaptor 224 to control communication from the communication device 150 to the communication carrier IoT infrastructure 110. Specifically, the communication carrier IoT infrastructure access function 223 refers to the SIM information 324 and the SIM-device association information 325 to control communication from the communication device 150 to the cloud service 120. Moreover, the communication carrier IoT infrastructure access function 223 records charge information 321 in accordance with the communication from the communication device 150 to the communication carrier IoT infrastructure 110.

The communication adaptor 224 is a file in which information for controlling the communication from the communication device 150 to the communication carrier IoT infrastructure 110 is defined. The communication adaptor 224 is used by the data distribution service infrastructure 100 to control the communication to the communication carrier IoT infrastructure 110.

The cloud service selection setting function 225 refers to "cloud service selection setting function" use data 330 to assist in selection of the cloud services 120 provided by the cloud business operators. Specifically, the cloud service selection setting function 225 presents, to the tenant, available service plans of the cloud business operators from the cloud service selection information 331, registers cloud service setting information 332 corresponding to a cloud business operator and a service plan selected by the tenant, and registers device information 333 shown in FIG. 7 corresponding to the cloud service setting information 332.

The cloud service access function 226 operates in linkage with the cloud service selection setting function 225. The cloud service access function 226 refers to the "cloud service selection setting function" use data 330, and uses the communication adaptor 227 to control the access from the communication device 150 to the cloud service 120. Specifically, the cloud service access function 226 controls the access from the communication device 150 to the cloud service 120 in accordance with the cloud service setting information 332 and the device information 333.

The communication adaptor 227 is a file in which information for controlling the communication from the communication device 150 to the cloud service 120 is defined. The communication adaptor 227 is used by the data distribution service infrastructure 100 to control the communication to the cloud service 120.

The device provisioning function 228 refers to "device provisioning function" use data 340 to control the data collection from the asset 160. Specifically, the device provisioning function 228 acquires an attribute of the asset 160 being a data source from asset information 343 shown in FIG. 8 and asset type information 344 shown in FIG. 9, and refers to device-asset association information 345 shown in FIG. 10 to identify the communication device 150 to which the asset 160 is connected.

The device manager access function 229 operates in linkage with the device provisioning function 228. The device manager access function 229 refers to the "device provisioning function" use data 340, and uses a communication adaptor 230 to control delivery of the device manager to the communication device 150. Specifically, the device manager access function 229 determines the device manager server 130 from which a selected device manager is to be distributed in accordance with device manager selection information 341, and records the device manager distributed to the communication device 150 in device distribution file management information 342.

The communication adaptor 230 is a file in which information for controlling the access from the communication device 150 to the device manager server 130 is defined. The communication adaptor 230 is used by the data distribution service infrastructure 100 to control the communication to the device manager server 130.

The IoT data collection/processing/management function 231 refers to "IoT data collection/processing/management function" use data 350 to manage data collected from the asset 160. Specifically, the IoT data collection/processing/management function 231 performs primary processing on the information on the asset 160 collected from the communication device 150 by the cloud service 120, and stores the processed information in the IoT data lake 109. After that, the IoT data collection/processing/management function 231 refers to processing information 351 to process information collected from the asset 160 (for example, convert data used within the device to a numerical value which can be recognized by the human), determines whether or not to generate an alert in accordance with alert threshold value setting information 352, and issues the alert in accordance with alert notification destination information 353.

The via-cloud-service IoT data function 232 operates in linkage with the IoT data collection/processing/management function 231, and uses an IoT data reception adaptor 233 to control reception of data from the cloud service 120 by the data distribution service infrastructure control server 101.

The IoT data reception adaptor 233 is a file in which information for controlling the access from the data distribution service infrastructure control server 101 to the cloud service 120 is defined, and is used by the data distribution service infrastructure 100 to control the communication to the cloud service 120.

The data illustrated in FIG. 4 is classified by the function which mainly uses the data, and can be used by other function blocks. Moreover, each piece of data is associated with a tenant, a user group, and a user. Each piece of data has data items corresponding thereto, or each piece of data is associated with the data of the tenant/user group/user information 311. Moreover, each piece of data has access authority set to each data item. For example, whether only an infrastructure-side administrator can access or the infrastructure-side administrator and a tenant-side user can access is set.

FIG. 5 is a diagram for illustrating a configuration example of the SIM information 324.

The SIM information 324 is a table in which information on a subscriber identity module (SIM) installed in the communication device 150 is recorded. The SIM information 324 includes SIM IDs 3241, MNOs 3242, tenant IDs 3243, profiles 3244, registered user IDs 3245, and registered dates 3246. The SIM information 324 may include, in addition to the shown data items, user group IDs, SIM statuses, updated user IDs, and update dates, for example.

The SIM ID 3241 is identification information uniquely assigned to a SIM, and, for example, integrated circuit card ID (ICCID) can be used. The MNO 3242 is a name of a communication carrier which provides the communication carrier IoT infrastructure 110. In the MNO 3242, identification information formed of a combination of a mobile country code (MCC) and a mobile network code (MNC) may be recorded. The tenant ID 3243 is identification information uniquely assigned to a tenant which uses this SIM. The profile 3244 is a communication profile (or a pointer specifying this communication profile) installed in the communication device 150 in which this SIM is installed. The registered user ID 3245 is an identification information on a user who has registered this SIM. The registered date 3246 is a date and time of the registration of this SIM. The registered date 3246 may be a time unique to an operating system as shown in FIG. 5, or may be a date and time having a form which can be recognized by the human.

FIG. 6 is a diagram for illustrating a configuration example of the SIM-device association information 325.

The SIM-device association information 325 is a table in which a correspondence between a SIM and a communication device 150 is recorded, and includes SIM IDs 3251, device IDs 3252, registered user ID 3253, and registered dates 3254. The SIM-device association information 325 may include, in addition to the shown data items, updated user IDs and update dates, for example.

The SIM ID 3251 is identification information uniquely assigned to a SIM. It is preferred to use the same value as the SIM ID 3241 of the SIM information 324. The device ID 3252 is identification information uniquely assigned to a communication device 150. It is preferred to use the same value as the device ID 3331 of the device information 333. The registered user ID 3253 is an identification information on a user who has registered this correspondence. The registered date 3254 is a date and time of the registration of this correspondence. The registered date 3254 may be a time unique to an operating system as shown in FIG. 6, or may be a date and time having a form which can be recognized by the human.

As long as the correspondence between the SIM and the communication device 150 does not change, the SIM-device association information 325 is not required to be provided, and one piece of data obtained by unifying the SIM information 324 and the device information 333 may be used for the management.

FIG. 7 is a diagram for illustrating a configuration example of the device information 333.

The device information 333 is a table in which information on the communication devices 150 is recorded, and includes device IDs 3331, tenant IDs 3332, device groups 3333, device names 3334, device certification 3335, registered user IDs 3336, and registered dates 3337. The device information 333 may include, in addition to the shown data items, processing statuses, for example. Moreover, both of identification information for internal management of the data distribution service infrastructure control server 101 and identification information unique to the communication device 150, such as a production number, may be recorded in association with each other. Information for setting a gateway to the communication device 150 may be recorded.

The device ID 3331 is identification information uniquely assigned to the communication device 150, and an international mobile equipment identity (IMEI) may be used. The tenant ID 3332 is identification information uniquely assigned to a tenant which uses this communication device 150. It is preferred to use the same value as the tenant ID 3243 of the SIM information 324. The device group 3333 is identification information on a group formed of a plurality of communication devices 150, and assigned for the convenience of management of the communication devices 150. The device name 3334 is a name of this communication device 150. In the device name 3334, the international mobile equipment identity (IMEI) may be recorded. The device certification 3335 is information for certifying the communication device 150 (or a pointer for specifying this device certification). The registered user ID 3336 is an identification information on a user who has registered this communication device 150. The registered date 3337 is a date and time of the registration of this communication device 150. The registered date 3337 may be a time unique to an operating system as shown in FIG. 7, or may be a date and time having a form which can be recognized by the human.

FIG. 8 is a diagram for illustrating a configuration example of the asset information 343.

The asset information 343 is a table in which information on the assets 160 are recorded, and includes asset IDs 3431, asset groups 3432, asset serials 3433, asset names 3434, and asset type IDs 3435. The asset information 343 may include, in addition to the shown data items, registered user IDs, registered dates, updated user IDs, and update dates, for example.

The asset ID 3431 is identification information uniquely assigned to an asset 160. The asset group 3432 is identification information on a group formed of a plurality of assets 160, and assigned for the convenience of management of the assets 160. The asset serial 3433 is a production number assigned to the asset 160. The asset name 3434 is a name of the asset 160. The asset type ID 3435 is a classification of the asset 160 defined in the asset type information 344.

FIG. 9 is a diagram for illustrating a configuration example of the asset type information 344.

The asset type information 344 is a table in which the classifications of assets 160 are defined, and includes asset type IDs 3441, tenants IDs 3442, and asset attributes 3443. The asset type information 344 may include, in addition to the shown data items, registered user IDs, registered dates, updated user IDs, and update dates, for example.

The asset type ID 3441 is identification information uniquely assigned to an asset type. The tenant ID 3442 is identification information uniquely assigned to a tenant which uses this asset 160. It is preferred to use the same value as the tenant ID 3243 of the SIM information 324. The asset attributes 3443 are detailed information (or a pointer for specifying a file in which this asset type information is recorded) on the asset 160.

FIG. 10 is a diagram for illustrating a configuration example of the device-asset association information 345.

The device-asset association information 345 is a table in which a correspondence between a communication device 150 and an asset 160 is recorded, and includes device IDs 3451, asset IDs 3452, registered user IDs 3453, and registration dates 3454. The device-asset association information 345 may include, in addition to the shown data items, updated user IDs and update dates, for example.

The device ID 3451 is identification information uniquely assigned to a communication device 150. It is preferred to use the same value as the device ID 3331 of the device information 333. The asset ID 3452 is identification information uniquely assigned to an asset 160. It is preferred to use the same value as the asset ID 3431 of the asset information 343. The registered user ID 3453 is identification information on a user who has registered this communication device 150. The registered date 3454 is a date and time of the registration of this communication device 150. The registered date 3454 may be a time unique to an operating system as shown in FIG. 10, or may be a date and time having a form which can be recognized by the human.

In FIG. 5 to FIG. 10, each piece of information is described in a table form. However, those pieces of information may be formed in data structure (for example, a list or a queue) other than the table, and do not depend on structure of a storage area. Moreover, the configuration of each piece of information is an example, and each piece of information may be divided and may then be held, or may be connected and may then be held.

Figure 11:
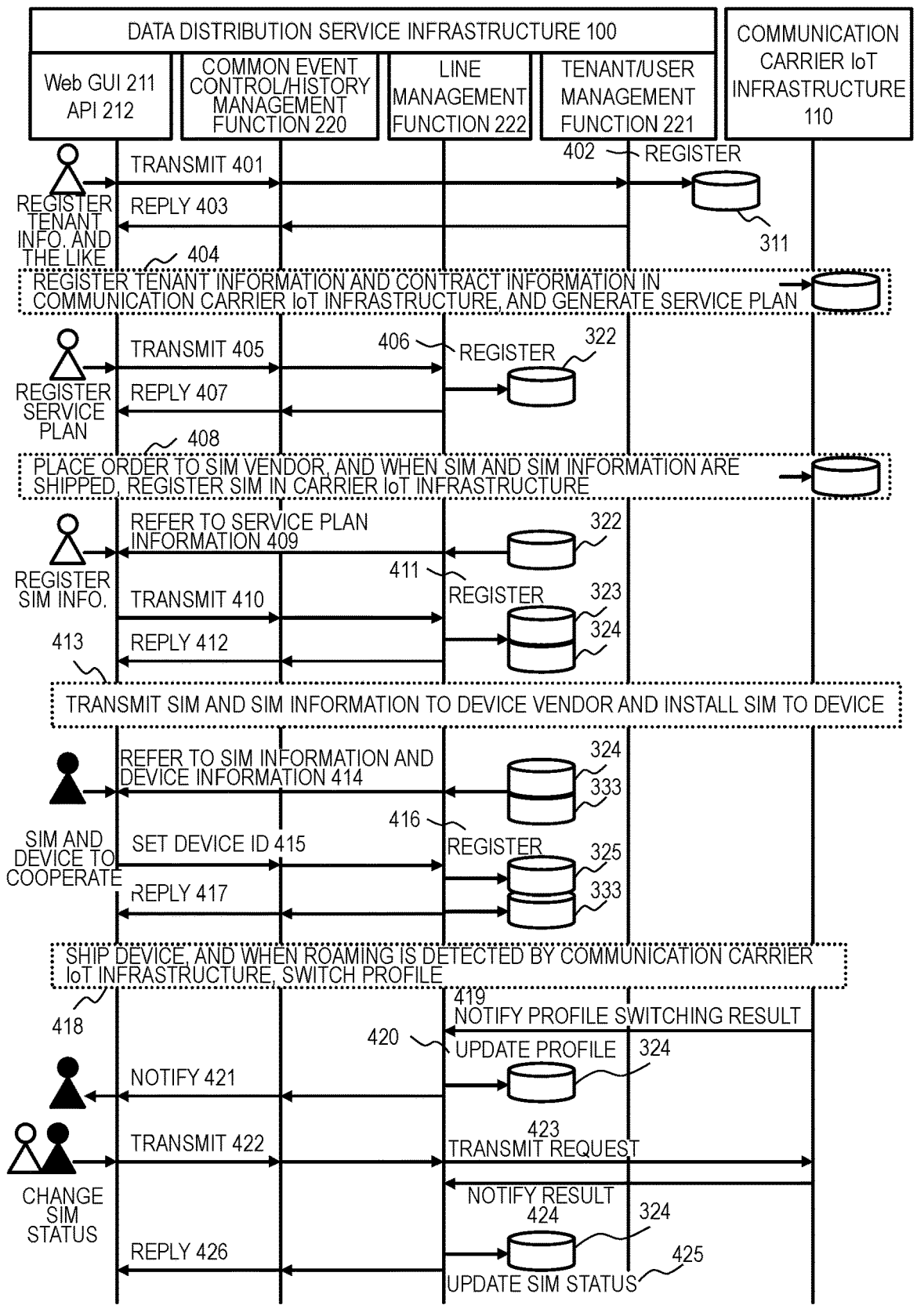
FIG. 11 is a sequence diagram of processing from a line contract to a line connecting.

FIG. 11 is a sequence diagram of processing from a line contract to a line connecting.

The infrastructure-side administrator inputs the tenant information, the user group information, and the user information from the Web GUI 211 or the API 212. The input information is transmitted from the Web GUI 211 or the API 212 to the tenant/user management function 221 through the common event control/history management function 220 (Step 401). The tenant/user management function 221 registers the input tenant information, user group information, and user information in the tenant/user group/user information 311 (Step 402), and transmits a registration completion reply to the Web GUI 211 or the API 212 (Step 403).

After that, the infrastructure-side administrator registers tenant information and contract information in the communication carrier IoT infrastructure 110, and generates a service plan (Step 404).

After that, the infrastructure-side administrator inputs the service plan from the Web GUI 211 or the API 212. The input information is transmitted from the Web GUI 211 or the API 212 to the line management function 222 through the common event control/history management function 220 (Step 405). The line management function 222 registers the input service plan in the service plan information 322 (Step 406), and transmits a registration completion reply to the Web GUI 211 or the API 212 (Step 407). After that, the infrastructure-side administrator orders a SIM from a SIM vendor.

At a timing at which the SIM and SIM information are shipped, the SIM is registered in the communication carrier IoT infrastructure 110 (Step 408).

After that, the infrastructure-side administrator refers to the service plan information 322 from the Web GUI 211 or the API 212 (Step 409), and inputs the SIM information. The input SIM information is transmitted from the Web GUI 211 or the API 212 to the line management function 222 through the common event control/history management function 220 (Step 410). The line management function 222 registers the input information in the SIM information 324 (Step 411), and transmits a registration completion reply to the Web GUI 211 or the API 212 (Step 412).

After that, when the infrastructure-side administrator transmits the SIM and the SIM information to the device vendor, the SIM is installed in the communication device 150 (Step 413).

After that, the tenant-side user refers to the SIM information 324 and the device information 333 from the Web GUI 211 or the API 212 (Step 414), and inputs the device ID. The input device ID is transmitted from the Web GUI 211 or the API 212 to the line management function 222 through the common event control/history management function 220 (Step 415). The line management function 222 registers the input device ID in the SIM-device association information 325 and the device information 333, to thereby update the information (Step 416), and transmits an update completion reply to the Web GUI 211 or the API 212 (Step 417).

After that, the communication device 150 is shipped, and roaming is detected in the communication carrier IoT infrastructure 110. The profile is then switched (Step 418).

After that, the communication carrier IoT infrastructure 110 notifies the line management function 222 of a profile switching result (Step 419). The line management function 222 updates the profile of the SIM information 324 (Step 420), and transmits an update completion reply to the Web GUI 211 or the API 212 (Step 421).

After that, the infrastructure-side administrator or the tenant-side user inputs a status change in the SIM from the Web GUI 211 or the API 212. The input SIM status is transmitted from the Web GUI 211 or the API 212 to the line management function 222 through the common event control/history management function 220 (Step 422). The line management function 222 transmits a SIM status change request to the communication carrier IoT infrastructure 110 (Step 423). The communication carrier IoT infrastructure 110 notifies the line management function 222 of a result of the SIM status change request (Step 424). The line management function 222 updates the SIM status of the SIM information 324 (Step 425), and transmits an update completion reply to the Web GUI 211 or the API 212 (Step 426).

Figure 12:
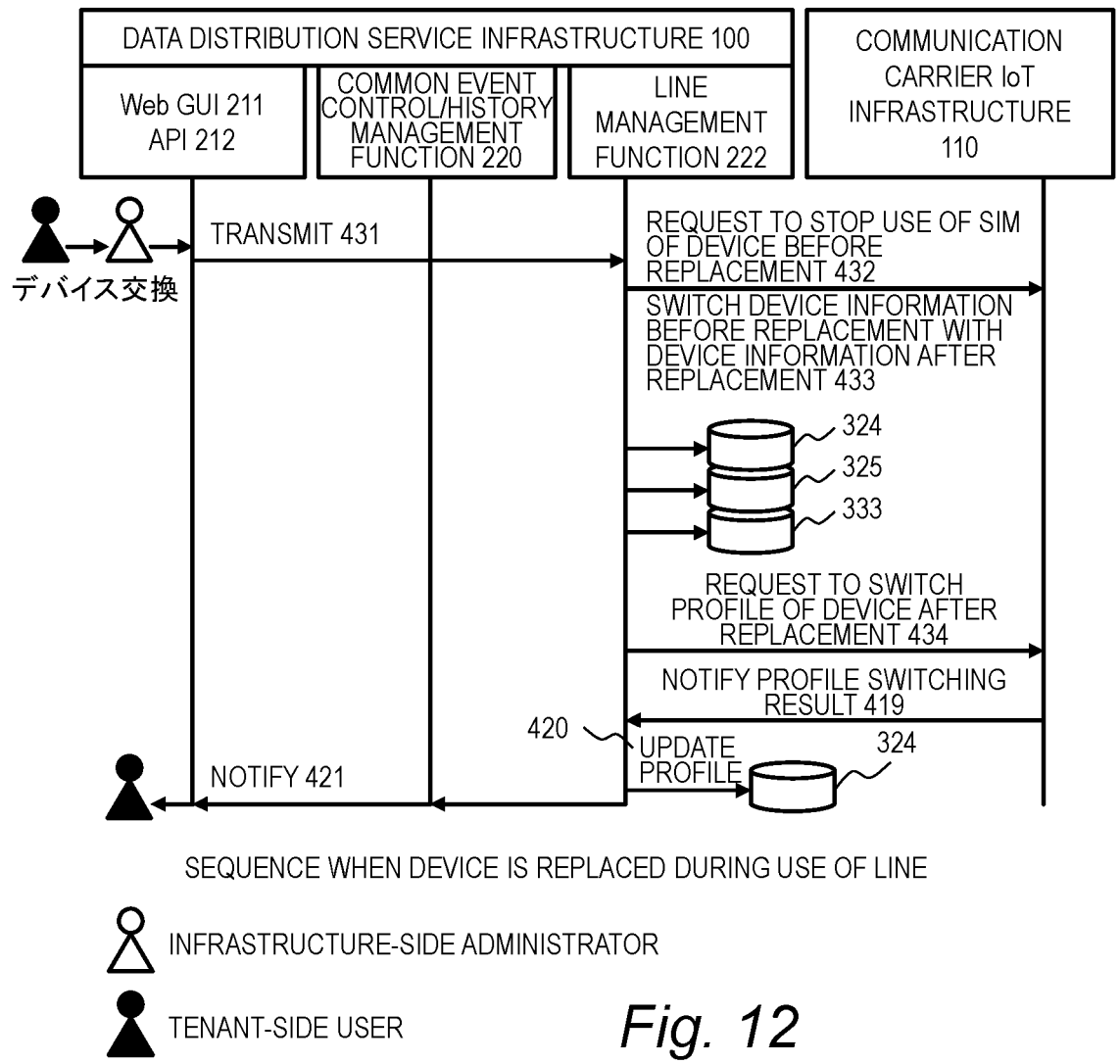
FIG. 12 is a sequence diagram of processing executed when a device is replaced during use of the line.

FIG. 12 is a sequence diagram of processing executed when a device is replaced during use of the line.

When a communication device 150 is replaced during the use of the line due to a failure of the communication device 150 or the like, the tenant-side administrator notifies the infrastructure-side administrator of the failure of the communication device 150. The infrastructure-side administrator inputs information on the communication device 150 before the replacement and information on the communication device 150 after the replacement from the Web GUI 211 or the API 212. The input information on the communication devices 150 is transmitted from the Web GUI 211 or the API 212 to the line management function 222 (Step 431).

The line management function 222 requests the communication carrier IoT infrastructure 110 to stop the use of the SIM of the device before the replacement (Step 432). Moreover, the line management function 222 replaces the information on the SIM of the communication device 150 before the replacement with the information on the SIM of the communication device 150 after the replacement in the SIM information 324, the SIM-device association information 325, and the device information 333 (Step 433). After that, the line management function 222 requests the communication carrier IoT infrastructure 110 for the profile of the device after the replacement (Step 434).

After that, the communication carrier IoT infrastructure 110 notifies the line management function 222 of a profile switching result (Step 419). The line management function 222 updates the profile of the SIM information 324 (Step 420), and transmits an update completion reply to the Web GUI 211 or the API 212 (Step 421).

The sequence of the processing executed when the device is replaced during the use of the line is illustrated in FIG. 12. When the SIM installed in the communication device 150 is replaced, processing steps equivalent to those of Step 431 to Step 434 and Step 419 to Step 421 are also executed. In other words, stop of the use of the SIM is requested before the SIM replacement (Step 432), and the SIM information 324 before the replacement and the SIM-device association information 325 are updated with the SIM information 324 after the replacement (Step 433). In this case, the device-asset association information 345 is not updated. After that, the SIM replacement can be achieved while the relationship between the communication device 150 and the asset 160 is maintained through a sequence of from the profile switching request (Step 434) to the profile update (Step 324) via the profile switching result notification (Step 419)

Figure 13:
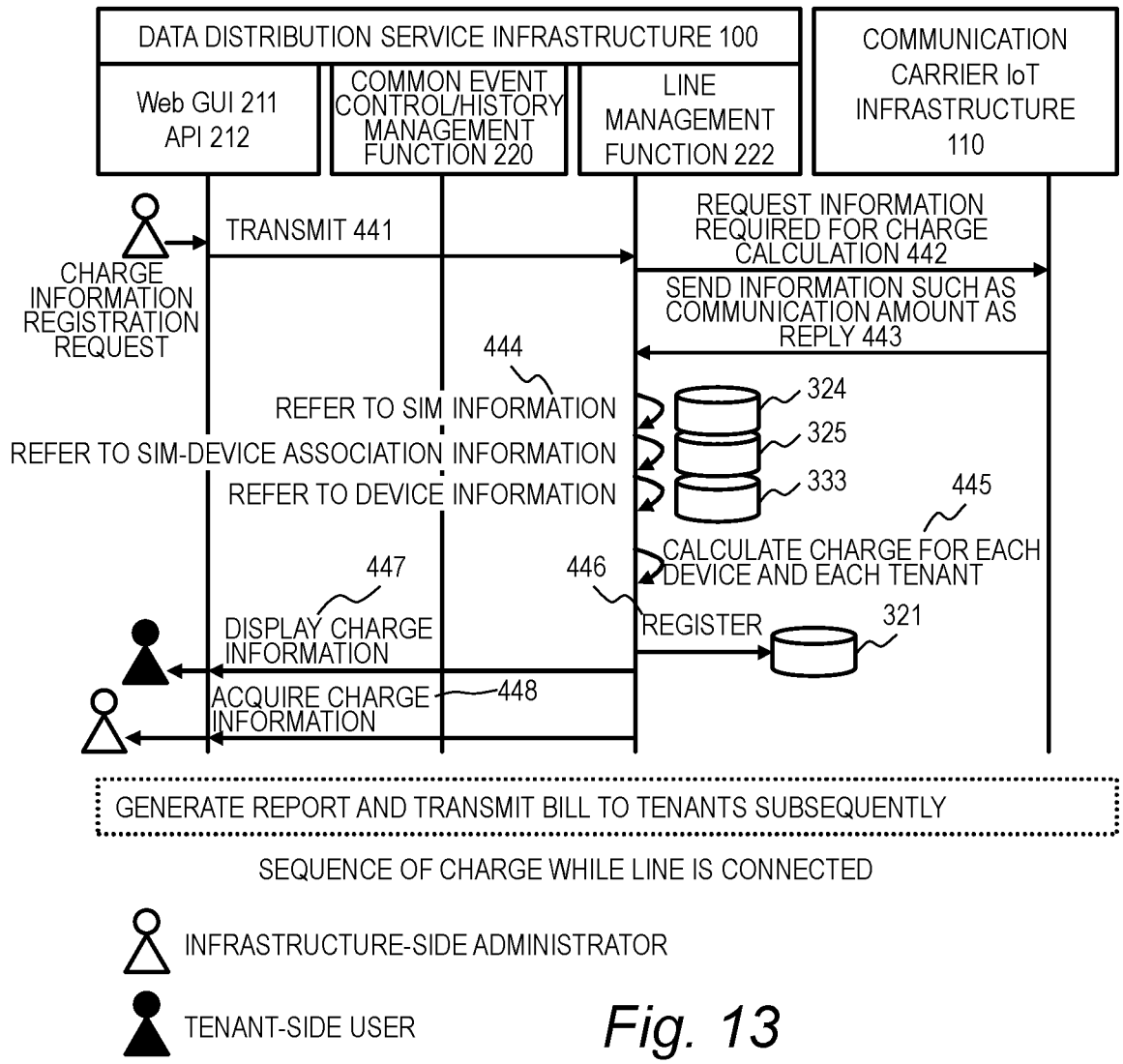
FIG. 13 is a sequence diagram of charge processing during the line connecting.

FIG. 13 is a sequence diagram of charge processing during the line connecting.

The infrastructure-side administrator requests registration of charge information from the Web GUI 211 or the API 212. The charge information registration request is transmitted from the Web GUI 211 or the API 212 to the line management function 222 (Step 441).

After that, the line management function 222 requests information required for charge calculation from the communication carrier IoT infrastructure 110 (Step S442). The communication carrier IoT infrastructure 110 sends, as a reply, information such as a communication amount (Step 443).

After that, the line management function 222 refers to the SIM information 324, the SIM-device association information 325, and the device information 333 (Step 444), calculates charge information for each device and for each tenant (Step 445), and registers the charge information 321 (Step 446).

After that, the line management function 222 transmits charge information directed to the tenant-side users and charge information directed to the infrastructure-side administrator to the Web GUI 211 or the API 212 (Step 447 and Step 448).

After that, the data distribution service infrastructure 100 may generate a report, and may transmit a bill to the tenant.

FIG. 14 is a sequence diagram of cloud service selection setting processing.

After that, the tenant-side user or the infrastructure-side administrator refers to the cloud service selection information 331 from the Web GUI 211 or the API 212 (Step 451), and inputs a cloud service 120 to be selected. The input selection of the cloud service 120 is transmitted from the Web GUI 211 or the API 212 to the cloud service selection setting function 225 (Step 452). The cloud service selection setting function 225 registers information on the selected cloud in the cloud service selection information 331 (Step 453), and refers to the cloud service setting information 332 to acquire items required to be set for this selection (Step S454). The cloud service selection setting function 225 sends, as a reply to the Web GUI 211 or the API 212, the acquired items required to be set (Step 455).

After that, the tenant-side user or the infrastructure-side administrator generates a setting required for the selected cloud service 120 (Step 456), and inputs the generated setting for the cloud service 120. The input setting for the cloud service 120 is transmitted from the Web GUI 211 or the API 212 to the cloud service selection setting function 225 (Step 457). The cloud service selection setting function 225 uses the cloud service setting to update the cloud service setting information 332 (Step 458), and transmits the cloud service setting to the cloud service 120 (Step 459). The cloud service 120 executes required processing, and sends, as a reply, completion of the processing to the service selection setting function 225 (Step S460). The cloud service selection setting function 225 sends, as a reply, the completion of the setting of the cloud service 120 to the Web GUI 211 or the API 212 (Step 461).

FIG. 15 is a sequence diagram of device provisioning processing.

The tenant-side user inputs an asset type being a target of the device provisioning. The input asset type is transmitted from the Web GUI 211 or the API 212 to the device provisioning function 228 (Step 471). The device provisioning function 228 registers the input asset type in the asset type information 344 (Step 472), and sends, as a reply, registration completion to the Web GUI 211 or the API 212 (Step 473).

After that, the tenant-side user refers to the asset type information 344 from the Web GUI 211 or the API 212 (Step 474) to input asset information being the target of the device provisioning. The input asset information is transmitted from the Web GUI 211 or the API 212 to the device provisioning function 228 (Step 475). The device provisioning function 228 registers the input asset information in the asset information 343 (Step 476), and sends, as a reply, registration completion to the Web GUI 211 or the API 212 (Step 477).

After that, the tenant-side user or the infrastructure-side administrator refers to the device manager selection information 341 from the Web GUI 211 or the API 212 (Step 478), and inputs a device manager to be selected. The input selection of the device manager is transmitted from the Web GUI 211 or the API 212 to the device provisioning function 228 (Step 479). The device provisioning function 228 registers information on the selected device manager in the device manager selection information 341 (Step 480), and sends, as a reply, registration completion to the Web GUI 211 or the API 212 (Step 481).

After that, information can be delivered to the device through the setup of the device manager (Step 482).

After that, the tenant-side user refers to the device information 333 and the asset information 343 from the Web GUI 211 or the API 212 (Step 483), and inputs association between the communication device 150 and the asset 160. The input association between the communication device 150 and the asset 160 is transmitted from the Web GUI 211 or the API 212 to the device provisioning function 228 (Step 484). The device provisioning function 228 registers the association between the communication device 150 and the asset 160 in the device-asset association information 345 (Step 485), and sends, as a reply, registration completion to the Web GUI 211 or the API 212 (Step 486).

After that, the tenant-side user or the infrastructure-side administrator refers to the device information 333 from the Web GUI 211 or the API 212 (Step 487), and specifies the communication device 150, to thereby request registration of firmware. The firmware the registration of which is requested is transmitted from the Web GUI 211 or the API 212 to the device provisioning function 228, and is registered in the device distribution file management information 342 (Step 488). After that, the device provisioning function 228 registers the firmware in a device manager server 130 corresponding to the device ID of the specified communication device 150 (Step 489), and sends, as a reply, registration completion to the Web GUI 211 or the API 212 (Step 490).

After that, the tenant-side user refers to the asset information 343 and the asset type information 344 from the Web GUI 211 or the API 212 (Step 491), and specifies asset information, to thereby request registration of a setting file. The setting file the registration of which is requested is transmitted from the Web GUI 211 or the API 212 to the device provisioning function 228. The device provisioning function 228 refers to the device-asset association information 345 to search for a communication device 150 corresponding to the specified asset 160 (Step 492), and registers the setting file for the retrieved communication device 150 in the device distribution file management information 342 (Step 493). After that, the device provisioning function 228 registers the setting file in the device manager server 130 corresponding to the device ID of the retrieved communication device 150 (Step 494), and sends, as a reply, registration completion to the Web GUI 211 or the API 212 (Step 495).

As described above, when the setting file is arranged in the storage in association with the device ID, and a URL for acquiring the setting file is notified to the communication device 150, an environment in which the communication device 150 can download the firmware and the setting file is prepared.

Figure 16:
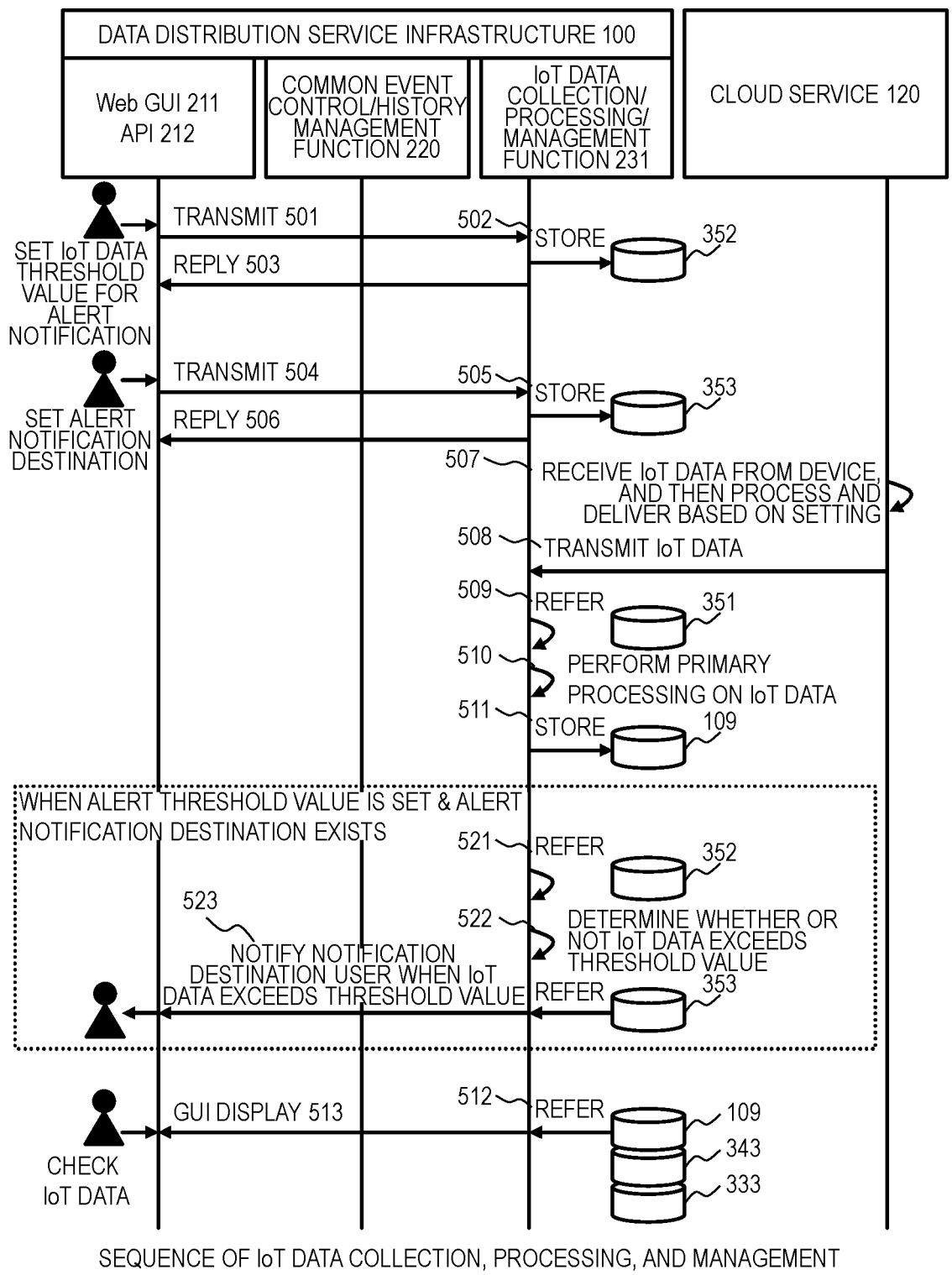
FIG. 16 is a sequence diagram of IoT data collection, processing, and management processing.

FIG. 16 is a sequence diagram of IoT data collection, processing, and management processing.

The tenant-side user inputs an alert notification IoT data threshold value. The input alert notification IoT data threshold value is transmitted from the Web GUI 211 or the API 212 to the IoT data collection/processing/management function 231 (Step 501). The IoT data collection/processing/management function 231 stores the transmitted alert notification IoT data threshold value in the alert threshold value setting information 352 (Step 502), and sends, as a reply, registration completion to the Web GUI 211 or the API 212 (Step 503).

After that, the tenant-side user inputs an alert notification destination. The input alert notification destination is transmitted from the Web GUI 211 or the API 212 to the IoT data collection/processing/management function 231 (Step 504). The IoT data collection/processing/management function 231 stores the transmitted alert notification destination in the alert notification destination information 353 (Step 505), and sends, as a reply, registration completion to the Web GUI 211 or the API 212 (Step 506).

After that, the cloud service 120 receives IoT data from the communication device 150, and then processes and delivers the IoT data based on the setting (Step 507). The cloud service 120 transmits the IoT data to the IoT data collection/processing/management function 231 (Step 508).

After that, the IoT data collection/processing/management function 231 refers to the processing information 351 to perform primary processing on the IoT data received from the communication device 150 (Step 510), and stores the IoT data in the IoT data lake 109 (Step 511). The primary processing performed in Step 510 is, for example, change in unit of temperature, or conversion of a value used inside the computer to a value recognizable by the human.

After that, the IoT data collection/processing/management function 231 refers to the IoT data lake 109, the asset information 343, and the device information 333 to transmit, to the Web GUI 211 or the API 212, data for GUI display (for example, information on the asset 160 superimposed on a map or a graph showing an operation state of the asset 160) (Step 513).

In the sequence of FIG. 16, in a case in which the alert threshold value is set, and the alert notification destination is set, after the IoT data collection/processing/management function 231 stores the IoT data on which the primary processing has been performed, the IoT data collection/processing/management function 231 refers to the alert threshold value setting information 352 (Step 521). The IoT data collection/processing/management function 231 then determines whether or not the IoT data on which the primary processing has been performed exceeds the threshold value (Step 522). When the IoT data exceeds the threshold value, the IoT data collection/processing/management function 231 transmits a notification to a notification destination user (Step 523).

Figure 17:
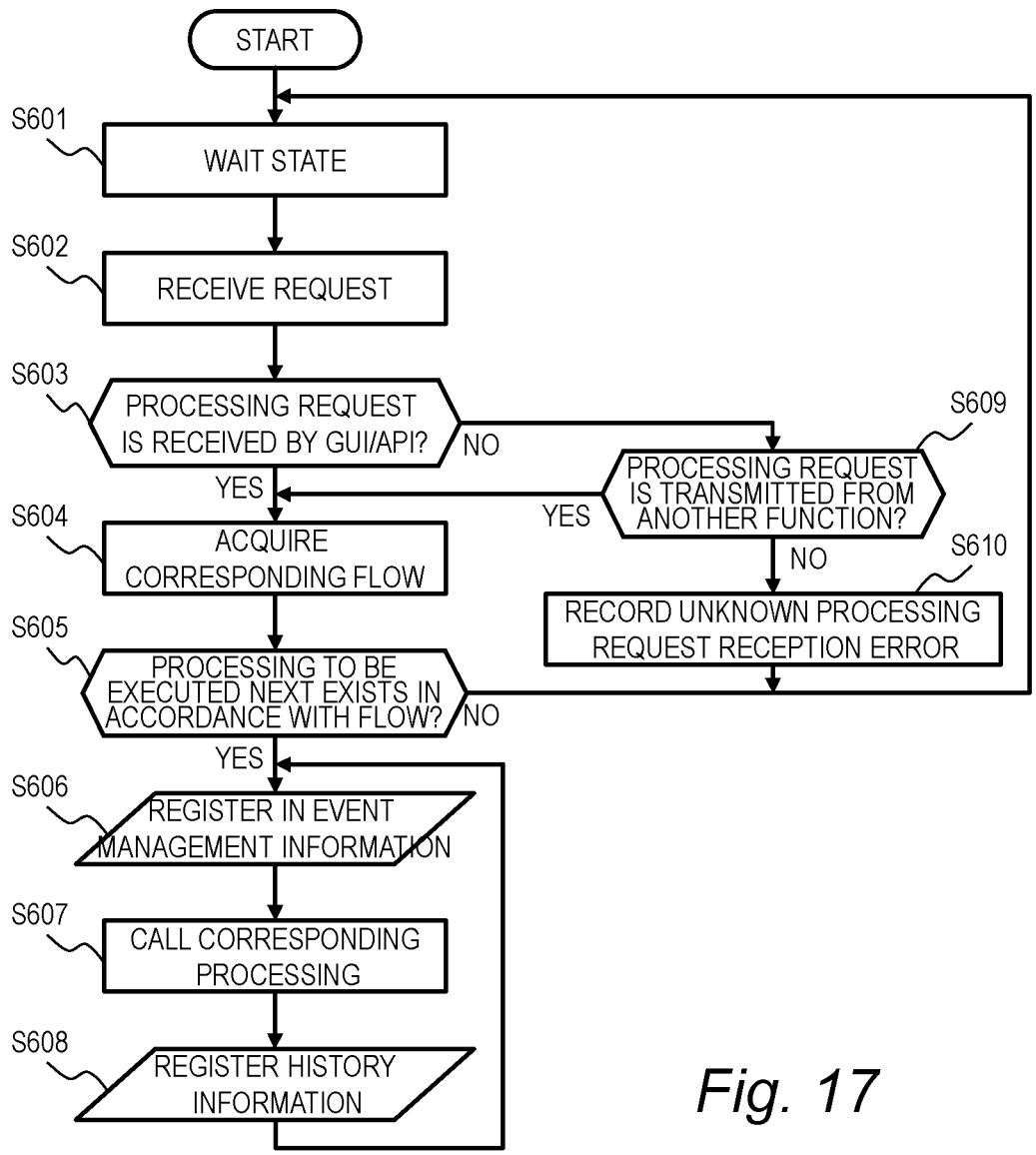
FIG. 17 is a flowchart of common event control processing and history management processing.

FIG. 17 is a flowchart of common event control processing and history management processing executed by the data distribution service infrastructure control server 101.

The I/F function 210 is brought into a wait state for waiting for reception of a request (Step S601). After that, the I/F function 210 receives a request (Step S602).

The common event control/history management function 220 determines whether or not a processing request is received in the I/F function 210 (Step S603). When a processing request is received in the I/F function 210, the common event control/history management function 220 acquires a logic flow corresponding to the received processing request (Step S604).

After that, the common event control/history management function 220 determines whether or not there exists processing to be executed next in accordance with the logic flow determined in advance (Step S605). When processing to be executed next does not exist, the process returns to Step S601, and the state becomes the wait state. Meanwhile, there is processing to be executed next, the common event control/history management function 220 registers information indicating a progress of the processing in the event management information 301 (Step S606). The common event control/history management function 220 calls corresponding processing (Step S607), and registers the history information 302 (Step S608). In this case, when processing to be executed in synchronization with the processing of the source of the call is to be called, the common event control/history management function 220 waits for a reply of execution completion of the processing of the destination of the call, and then the process proceeds to a next step. Meanwhile, when processing to be executed asynchronously is to be called, the common event control/history management function 220 starts the processing of the destination of the call, and then the process proceeds to the next step.

Meanwhile, when a processing request is not received in the I/F function 210, the common event control/history management function 220 determines whether or not the processing request is transmitted from another function (S609). When the transmission source of the processing request is another function, the process proceeds to Step S604, and the common event control/history management function 220 acquires a logic flow corresponding to the received processing request. Meanwhile, when the transmission source of the processing request is unknown, the common event control/history management function 220 records an unknown processing request reception error in the history information 302 (Step S610).

Figure 18:
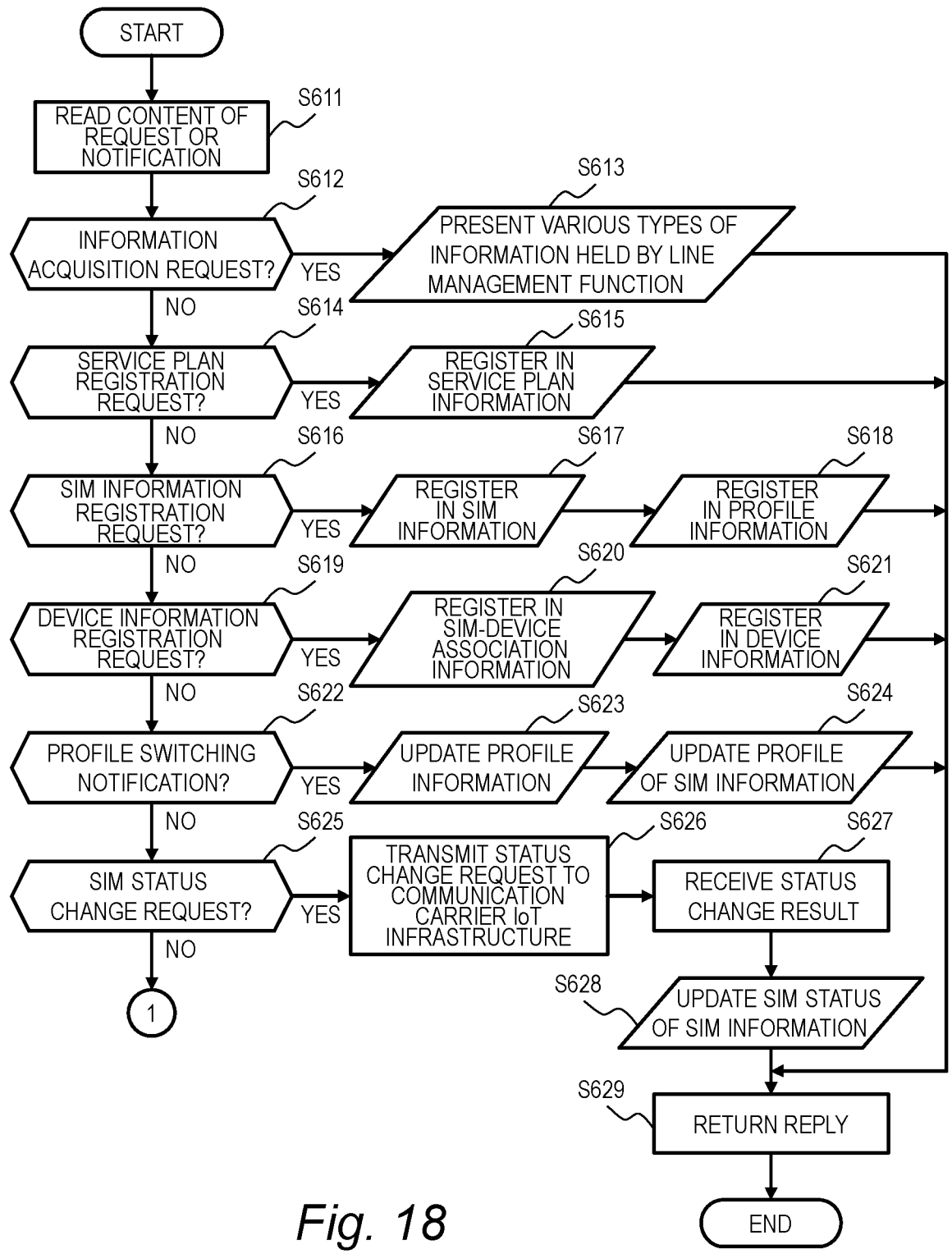
FIG. 18 is flowchart of line management processing.
Figure 19:
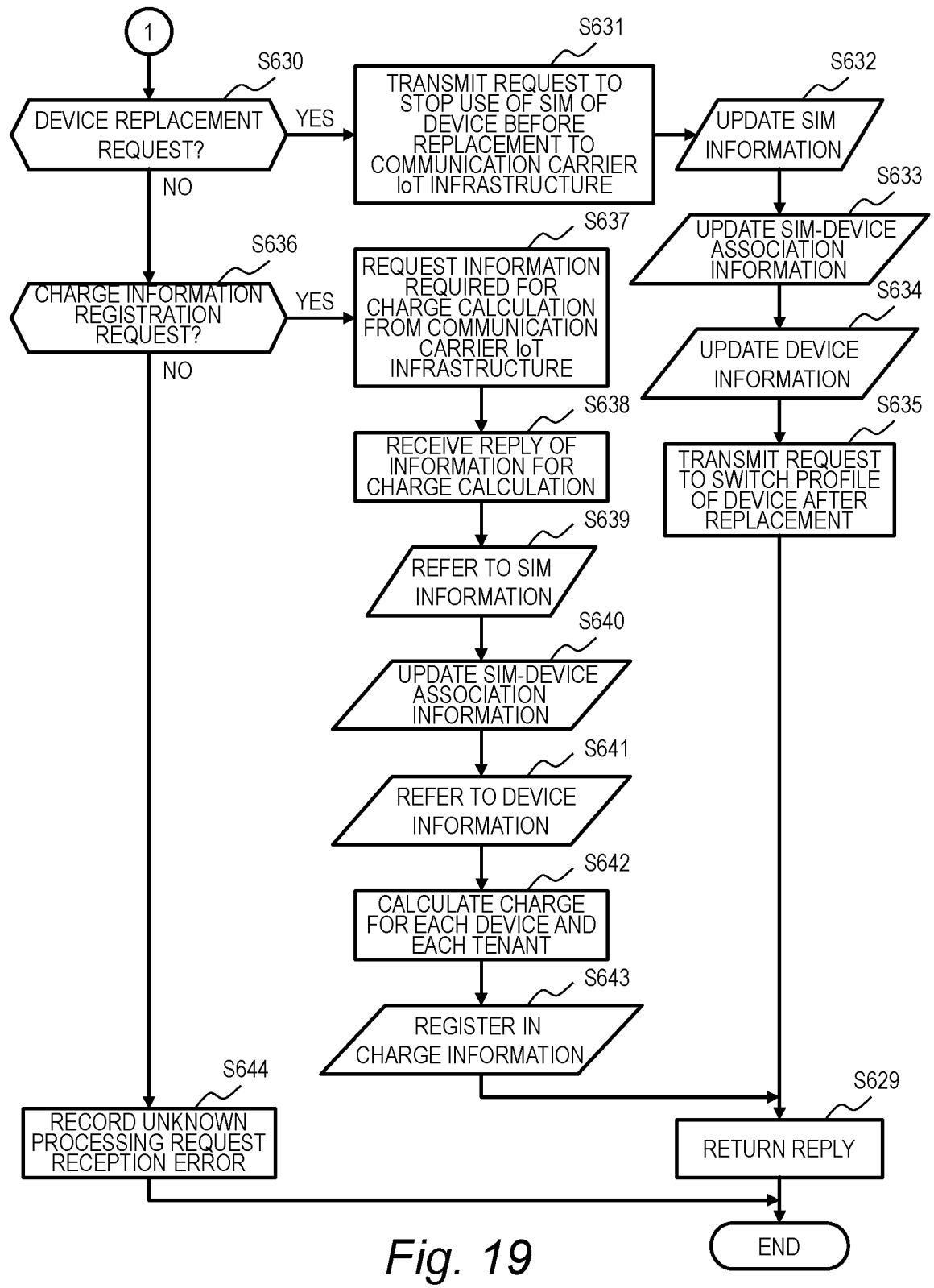
FIG. 19 is flowchart of line management processing.

FIG. 18 and FIG. 19 are flowcharts of line management processing executed by the data distribution service infrastructure control server 101.

The line management function 222 reads a content of a request or a notification (Step S611). The processing branches subsequently in accordance with the content of the read request.

When the read request is an information acquisition request (YES in Step S612), the line management function 222 acquires the "line management function" use data 320, and generates presentation data (Step S613). The line management function 222 returns a reply for presenting the acquired data (Step S629).

When the read request is a service plan registration request (YES in Step S614), the line management function 222 registers a service plan the registration of which is requested in the service plan information 322 (Step S615), and returns the registration completion reply (Step S629).

When the read request is a SIM information registration request (YES in Step S616), the line management function 222 registers SIM information the registration of which is requested in the SIM information 324 and the profile information 323 (Step S617 and Step S618), and returns the registration completion reply (Step S629).

When the read request is a device information registration request (YES in Step S619), the line management function 222 registers device information the registration of which is requested in the SIM-device association information 325 and the device information 333 (Step S620 and Step S621), and returns the registration completion reply (Step S629).

When the read notification is a profile switching notification (YES in Step S622), the line management function 222 updates the profile information 323 and the profile 3244 of the SIM information 324 (Step S623 and Step S624), and returns an update completion reply (Step S629).

When the read request is a SIM status change request (YES in Step S625), the line management function 222 transmits a status change request to the communication carrier IoT infrastructure 110 (Step S626). After the line management function 222 receives a status change result (Step S627), the line management function 222 updates the SIM status of the SIM information 324 (Step S628), and returns the update completion reply (Step S629).

When the read request is a device replacement request (YES in Step S630), the line management function 222 transmits a request to stop the use of a SIM of a device before replacement to the communication carrier IoT infrastructure 110 (Step S631), and updates the SIM information 324, the SIM-device association information 325, and the device information 333 to information after the replacement (Step S632, Step S633, and Step S634). The line management function 222 transmits the request to switch the profile of the device after the replacement to the communication carrier IoT infrastructure 110 (Step S635), and returns the update completion reply (Step S629).

When the read request is a charge information registration request (YES in Step S636), the line management function 222 requests information (for example, the communication amount) required for the charge calculation from the communication carrier IoT infrastructure 110 (Step S637), and receives a reply of the information for the charge calculation (Step S638). The line management function 222 refers to the SIM information 324, the SIM-device association information 325, and the device information 333 (Step S639, Step S640, and Step S641), and calculates a charge for each device and for each tenant (Step S642). The line management function 222 registers the calculated charge amounts in the charge information 321 (Step S643), and returns the registration completion reply (Step S629).

When the read request is not the charge information registration request, that is, when the case corresponds to none of Step S612, Step S614, Step S616, Step S619, Step S622, Step S625, Step S630, and Step S636, the line management function 222 records the unknown processing request reception error in the history information 302 (Step S644).

Figure 20:
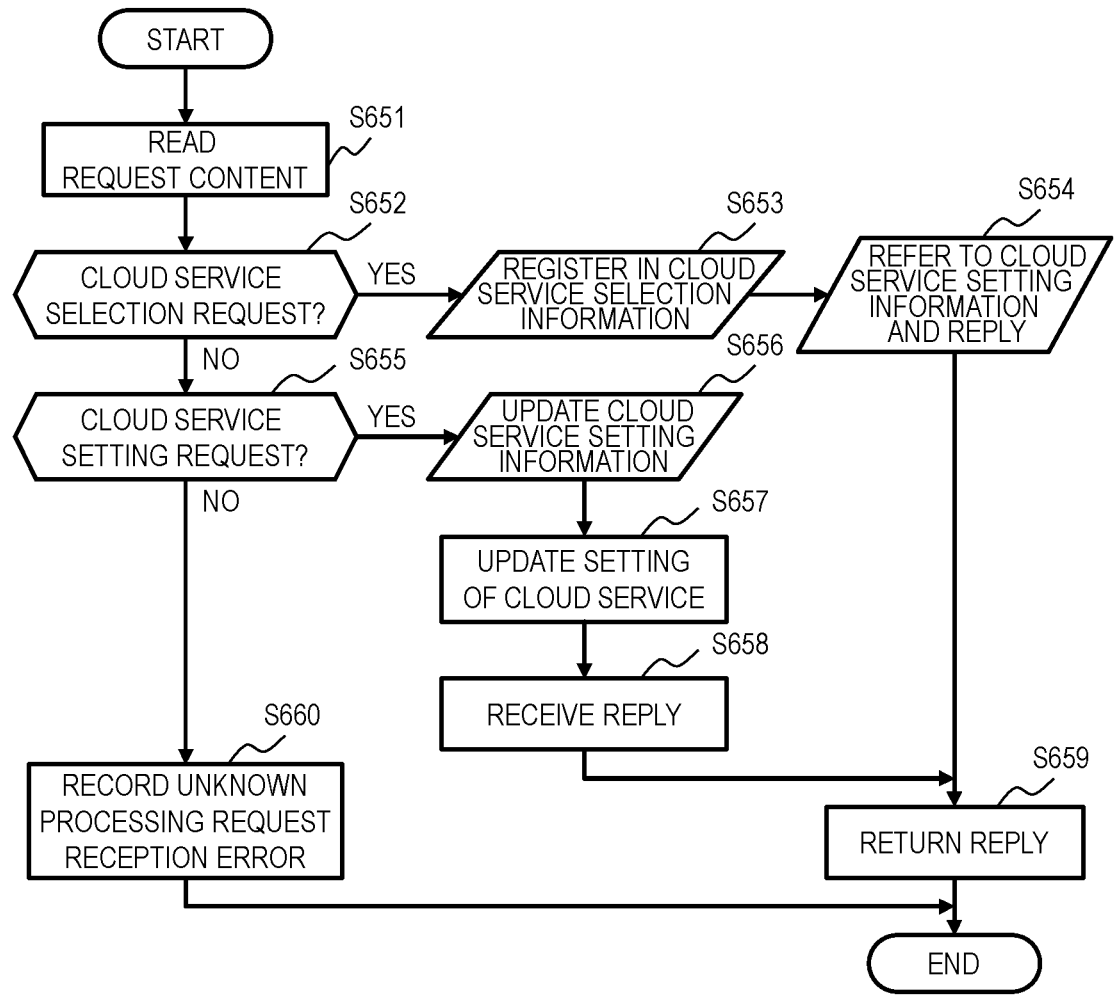
FIG. 20 is a flowchart of cloud service selection setting processing.

FIG. 20 is a flowchart of cloud service selection setting processing executed by the data distribution service infrastructure control server 101.

The cloud service selection setting function 225 reads a content of a request (Step S651). The processing branches subsequently in accordance with the content of the read request.

When the read request is a cloud service selection request (YES in Step S652), the cloud service selection setting function 225 registers the selected cloud service 120 in the cloud service selection information 331 (Step S653). The cloud service selection setting function 225 refers to the cloud service setting information 332 to generate reply data for making notification of items required to be set (Step S654), and returns a reply (Step S659).

When the read request is a cloud service setting request (YES in Step S655), the cloud service selection setting function 225 uses a cloud service 120 setting of which is requested to update the cloud service setting information 332 (Step S656), and updates the setting of the specified cloud service 120 (Step S657). The cloud service selection setting function 225 receives a reply of setting completion (Step S658), and returns the reply of the setting completion (Step S659).

When the read request is not the cloud service setting request, that is, when the case corresponds to none of Step S652 and Step S655, the cloud service selection setting function 225 records the unknown processing request reception error in the history information 302 (Step S660).

FIG. 21 is a flowchart of device provisioning processing executed by the data distribution service infrastructure control server 101.

The device provisioning function 228 reads a content of a request (Step S661). The processing branches subsequently in accordance with the content of the read request.

When the read content is an information acquisition request (YES in Step S662), the device provisioning function 228 acquires the "device provisioning function" use data 340, and generates presentation data (Step S663). The device provisioning function 228 returns a reply for presenting the acquired data (Step S681).

When the read request is an asset type information registration request (YES in Step S664), the device provisioning function 228 registers asset type information the registration of which is requested in the asset type information 344 (Step S665), and returns a registration completion reply (Step S681).

When the read request is an asset information registration request (YES in Step S666), the device provisioning function 228 registers asset information the registration of which is requested in the asset information 343 (Step S667), and returns the registration completion reply (Step S681).

When the read request is a device manager selection request (YES in Step S668), the device provisioning function 228 registers a selected device manager in the device manager selection information 341 (Step S669), and returns the registration completion reply (Step S681).

When the read request is a device-asset association information registration request (YES in Step S670), the device provisioning function 228 registers association the registration of which is requested in the device-asset association information 345 (Step S671), and returns the registration completion reply (Step S681).

When the read request is a device specification firmware registration request (YES in Step S672), the device provisioning function 228 registers firmware the registration of which is requested in the device distribution file management information 342 (Step S673). The device provisioning function 228 refers to the device manager selection information 341 (Step S674), registers the firmware in a device manager corresponding to a device ID corresponding to the specified communication device 150 (Step S675), and returns the registration completion reply (Step S681).

When the read request is an asset information specification setting file registration request (YES in Step S676), the device provisioning function 228 searches the device-asset association information 345, and identifies a communication device 150 corresponding to asset information relating to the registration request (Step S677). The device provisioning function 228 registers the communication device 150 in the device distribution file management information 342 (Step S678). Further, the device provisioning function 228 refers to the device manager selection information 341 (Step S679), and registers a setting file in a device manager corresponding to a device ID of the identified communication device 150 (Step S680). The device provisioning function 228 returns the registration completion reply (Step S681).

When the read request is not the asset information specification setting file registration request, that is, when the case corresponds to none of Step S662, Step S664, Step S666, Step S668, Step S670, Step S672, and Step S676, the device provisioning function 228 records the unknown processing request reception error in the history information 302 (Step S682).

Figure 22:
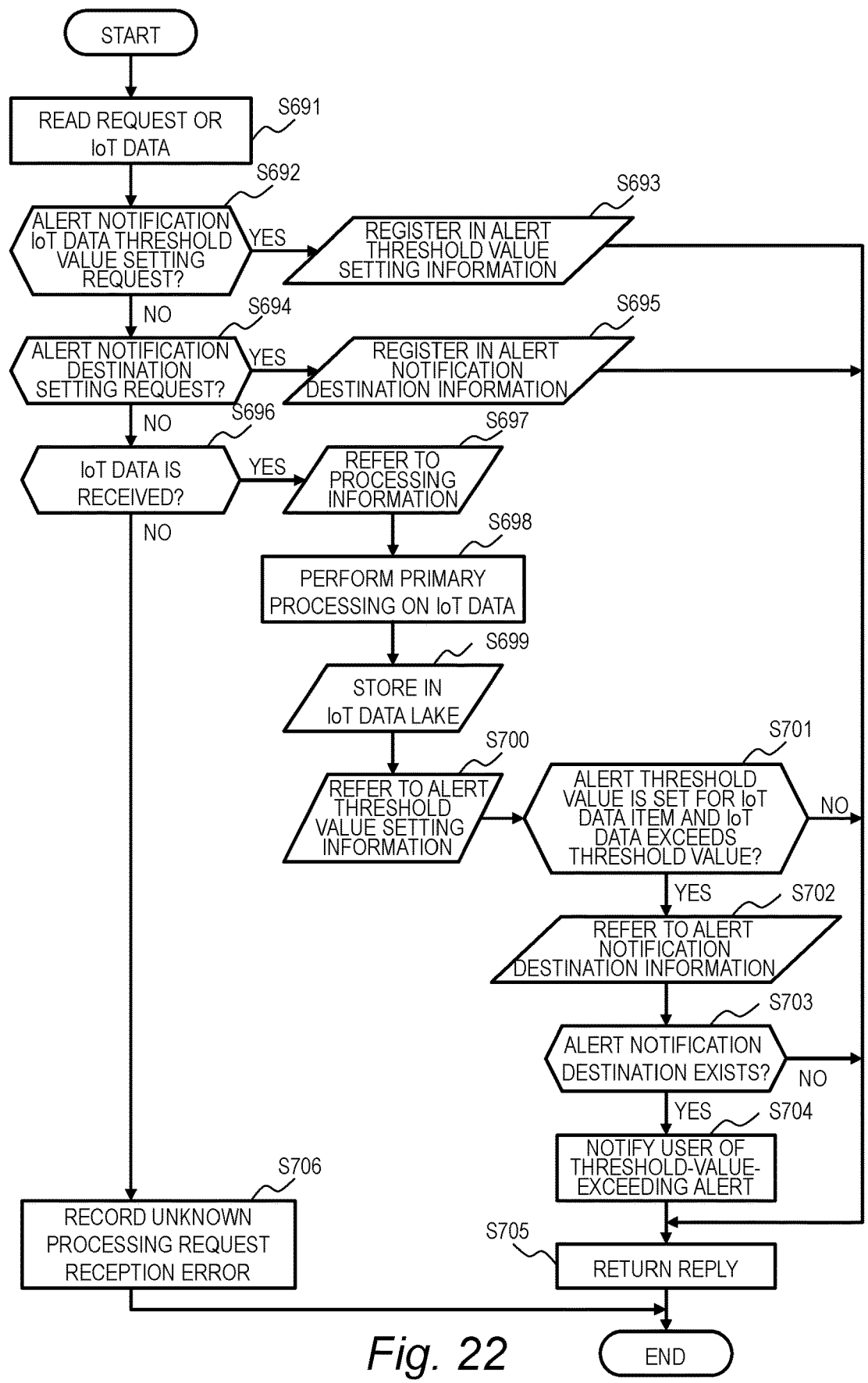
FIG. 22 is a flowchart of IoT data collection, processing, and management processing.

FIG. 22 is a flowchart of IoT data collection, processing, and management processing executed by the data distribution service infrastructure control server 101.

The IoT data collection/processing/management function 231 reads a content of a received request or IoT data (Step S691). The processing branches subsequently in accordance with the content of the read request.

When the read data is an alert notification IoT data threshold value setting request (YES in Step S692), the IoT data collection/processing/management function 231 registers an IoT data threshold value the registration of which is requested in the alert threshold value setting information 352 (Step S693), and returns a registration completion reply (Step S705).

When the read data is an alert notification destination setting request (YES in Step S694), the IoT data collection/processing/management function 231 registers an alert notification destination the setting of which is requested in the alert notification destination information 353 (Step S695), and returns the registration completion reply (Step S705).

When the read data is IoT data (YES in Step S696), the IoT data collection/processing/management function 231 refers to the processing information 351 (Step S697). The IoT data collection/processing/management function 231 performs the primary processing on the received IoT data (Step S698), and stores the IoT data on which the primary processing has been performed in the IoT data lake 109 (Step S699). After that, the IoT data collection/processing/management function 231 refers to the alert threshold value setting information 352 (Step S700), and determines whether or not an alert threshold value is set for a data item of the received IoT data and the received IoT data exceeds the threshold value (Step S701). When the alert threshold value is not set or the received IoT data does not exceed the threshold value, the IoT data collection/processing/management function 231 returns a reply of a reception completion (alert is not required) (Step S705). Meanwhile, when the alert threshold value is set, and the received IoT data exceeds the threshold value, the IoT data collection/processing/ management function 231 refers to the alert notification destination information 353 (Step S702), and determines whether or not an alert notification destination is registered (Step S703). When an alert notification destination is registered, the IoT data collection/processing/management function 231 generates data for notifying the user of a threshold-value-exceeding alert (Step S704), and returns a reply of the generated alert (Step S705).

When the read request is not the asset information specification setting file registration request, that is, when the case corresponds to none of Step S692, Step S694, and Step S696, the IoT data collection/processing/management function 231 records the unknown processing request reception error in the history information 302 (Step S706).

Figure 23:
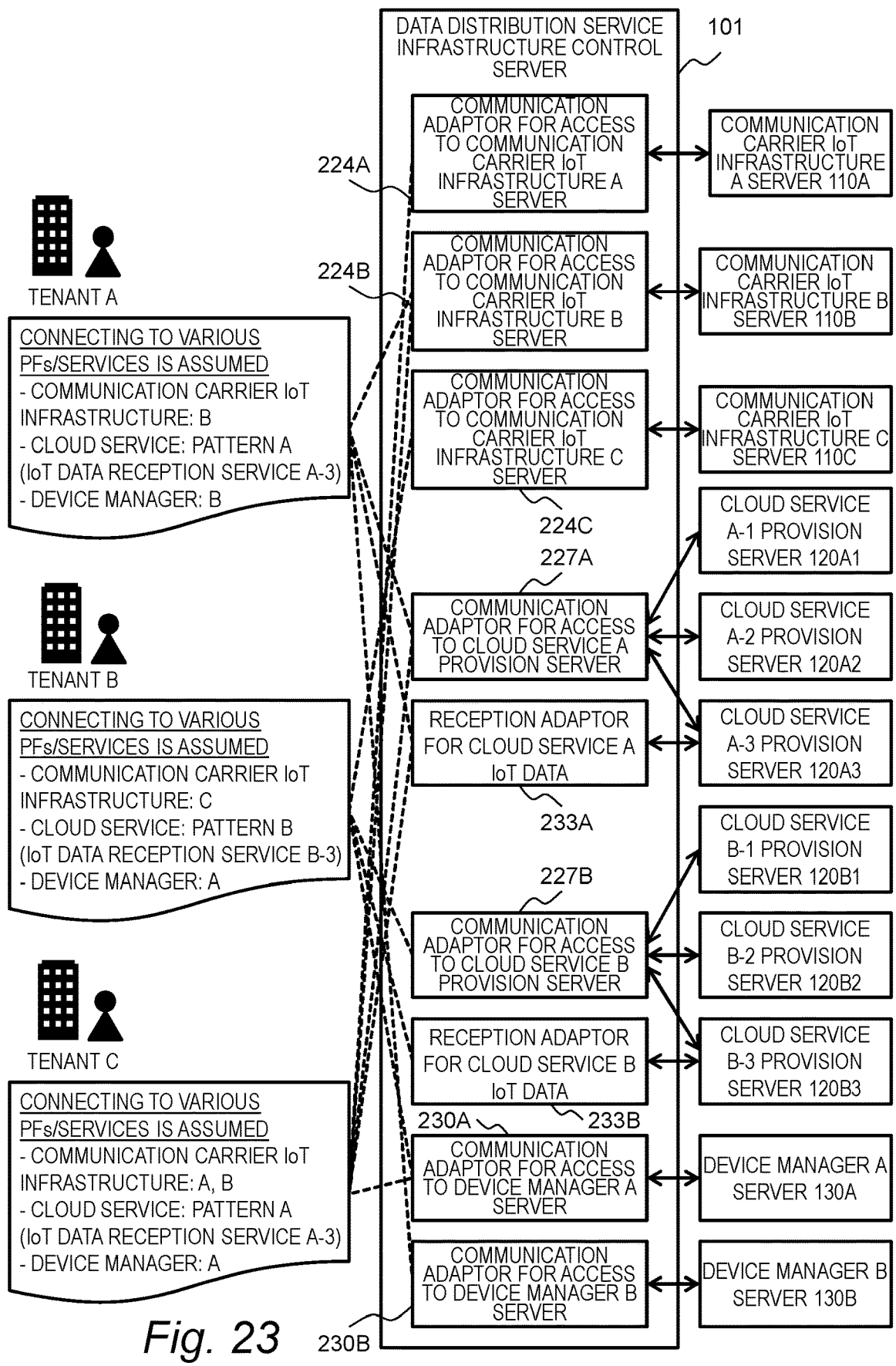
FIG. 23 is a diagram for illustrating accesses to the server by a plurality of tenants through use of the communication adaptors.

FIG. 23 is a diagram for illustrating accesses to the server by a plurality of tenants through use of the communication adaptors.

The data distribution service infrastructure control server 101 sets a communication adaptor and a reception adaptor to be used through selection of each tenant. The access destinations 110, 120, and 130 can be determined through the selection of the communication adaptor and the reception adaptor.

Specifically, a communication adaptor 224 to be used, that is, a communication carrier IoT infrastructure 110 being an opposite party of the communication is determined by setting the MNO and the profile of the SIM information. Moreover, a communication adaptor 227 and a IoT data reception adaptor 233 to be used, that is, cloud services 120 to be used are determined through the cloud service selection setting. Moreover, a communication adaptor 230 to be used, that is, a device manager server 130 to be used is determined through the device manager selection setting. Those may be determined by the tenant-side user or the infrastructure-side administrator.

FIG. 24 is a diagram for illustrating distribution of a configuration file corresponding to the asset 160 by the device manager server 130.

For example, consideration is given to a case in which a configuration file (cfg-X-v2) for an asset of a type-X installed in the communication devices 150 connected to the assets 160 of the type-X is to be updated.

The tenant-side user accesses the data distribution service infrastructure control server 101, and requests update of the configuration file for the asset of the type-X from the Web GUI 211 or the API 212.

The device provisioning function 228 refers to the asset information 343 and the device-asset association information 345 to identify the communication devices 150 corresponding to the assets 160 being the target of the configuration file update. As a result, it is recognized that devices connected to the assets of the type-X are d0000 and d0001. After that, the device provisioning function 228 registers, as file management information, a version and a date of the configuration file and the like in the device distribution file management information 342. After that, the device provisioning function 228 accesses the device manager server 130, and requests update of the configuration file of the communication devices d0000 and d0001 to that of v2.

The device manager server 130 includes a firmware/ configuration file management database, and refers to the firmware/configuration file management database to acquire access destination information of the configuration file to be distributed. After that, the device manager server 130 notifies the communication devices 150 the configuration file of which is to be updated of a version of the new configuration file and the access destination information. For example, the device manager server 130 notifies the communication device 150 of, as information directed to the communication device d0000, the configuration file name of cfg-X-v2 and a URL (token) for acquiring this configuration file.

The device manager server 130 may periodically acquire information from the communication device 150 in addition to distributing the download destination URL and managing and delivering files as described above. Moreover, the device manager server 130 does not manage a correspondence between the communication device 150 and the asset 160, but distributes the configuration file to the communication device 150 in accordance with the instruction from the data distribution service infrastructure control server 101. Thus, the device manager server 130 can update the configuration file of the communication device 150 without considering the asset 160. Meanwhile, the data distribution service infrastructure control server 101 knows the attribute of the asset 160 and knows the correspondence between the communication device 150 and the asset 160, and can thus generate the update information for the communication device 150 in consideration of the asset 160 being the connecting destination of the communication device 150.

The communication device 150 acquires the configuration file for the asset of the type-X (cfg-X-v2) in accordance with the notification from the device manager server 130. The configuration file may be acquired through the access from the communication device 150, or may be distributed through push transmission to the communication device 150. As a result, the configuration file (cfg-X-v1) for the communication device d0000 connected to an asset a0000 of the type-X is updated to the new configuration file (cfg-X-v2).

FIG. 25 is a diagram for illustrating an example of a device list screen 800 output by the Web GUI 211.

The device list screen 800 includes a function selection button 801, a display button 802, an update button 803, a search button 804, a search target item selection field 805, a search condition input field 806, and a device list display area 810.

The function selection button 801 is a button for opening a menu for selecting processing to be executed on this screen. Selection of addition, editing, deletion, association with an asset, a firmware distribution request, a configuration file distribution request, and data output is available for the communication device 150. For example, it is possible to select "edit" from the menu, to thereby update the SIM installed in the communication device 150 while the relationship between the communication device 150 and the asset 160 is maintained. Moreover, it is possible to select "associate with asset" from the menu, to thereby update the relationship between the communication device 150 and the asset 160 while the relationship between the SIM and the communication device 150 is maintained.

The display button 802 is a button for opening a menu for selecting data items to be displayed. The update button 803 is a button for update to the latest display. The search target item selection field 805 is a button for selecting an item by which search is to be executed. Selection of search by a specified item and search by all of items is available. The search condition input field 806 is a field for inputting a word to be searched for in the item by which search is to be executed. The search button 804 is a button operated when the search is started under the input search condition.

The device list display area 810 is an area in which a list of the managed communication devices 150 is displayed. In the illustrated state, device IDs, device groups, device names, SIM IDs, and asset IDs are displayed. The information to be displayed is registered in the device information 333 and the device-asset association information 345.

A display order can be changed to an ascending order or a descending order by selecting an arrow next to each data item displayed on the device list display area 810.

Through the selection operation of the display item of the device list display area 810, a list of the selected item can be displayed. For example, when the asset ID is clicked, an asset list screen 900 illustrated in FIG. 26 is displayed. When the SIM ID is clicked, a SIM list screen (not shown) is displayed. When the device group is clicked, a device group list screen (not shown) is displayed.

FIG. 26 is a diagram for illustrating an example of an asset list screen 900 output by the Web GUI 211.

The asset list screen 900 includes a function selection button 901, a display button 902, an update button 903, a search button 904, a search target item selection field 905, a search condition input field 906, and an asset list display area 910.

The function selection button 901 is a button for opening a menu for selecting processing to be executed on this screen. Selection of addition, editing, deletion, association with a communication device, a configuration file distribution request, and data output is available for the asset. For example, it is possible to update, through selection of "associate with communication device" from the menu, the relationship between the communication device 150 and this asset 160 so that this asset 160 is associated with another communication device 150.

The display button 902 is a button for opening a menu for selecting data items to be displayed. The update button 903 is a button for update to the latest display. The search target item selection field 905 is a button for selecting an item by which search is to be executed. Selection of search by a specified item and search by all of items is available. The search condition input field 906 is a field for inputting a word to be searched for in the item by which search is to be executed. The search button 904 is a button operated when the search is started under the input search condition.

The asset list display area 910 is an area in which a list of the managed assets 160 is displayed. In the illustrated state, asset IDs, asset serials, asset names, asset type IDs, and device IDs are displayed. The information to be displayed is registered in the asset information 343 and the device-asset association information 345.

A display order can be changed to an ascending order or a descending order by selecting an arrow next to each data item displayed on the asset list display area 910. Through the selection operation of the display item of the asset list display area 910, a list of the selected item can be displayed. For example, when the device ID is clicked, the device list screen 800 illustrated in FIG. 25 is displayed. When the SIM ID is clicked, the SIM list screen (not shown) is displayed. When the device group is clicked, the device group list screen (not shown) is displayed.

As described above, the IoT system (data distribution service infrastructure 100) according to the at least one embodiment includes the communication device 150 in which the identification module (SIM) for controlling the communication requirement is installed, and which is configured to communicate to/from the cloud server (cloud service 120), the asset 160 which is connected to the communication device 150, and the control server (data distribution service infrastructure control server 101) configured to manage the setting of the communication between the communication device 150 and the cloud service 120. The data distribution service infrastructure control server 101 is configured to manage the relationship (SIM-device association information 325) between the SIM and the communication device 150 and the relationship (device-asset association information 345) between the communication device 150 and the asset 160, and to set the communication between the communication device 150 and the cloud service 120 in order to transfer information from the asset 160 to the cloud service 120. It is accordingly possible to uniformly control the elements required for the IoT system. As a result, it is possible to analyze the data collected from a large number of globally deployed assets 160, to thereby achieve a flexible maintenance operation such as pre-maintenance through failure prediction and ascertainment of a replacement destination based on position information.

Moreover, in order to utilize the data on the globally deployed assets 160, it is not required to individually execute (1) selection of a communication carrier and development of applications for connecting to lines after an IoT platform at each site and in each country is understood, (2) selection of the communication device 150 and development of an application for the communication device in order to collect and wirelessly transmit the data on the assets 160, and (3) construction of a system for collecting, accumulating, and visualizing the IoT data in cooperation with the cloud services 120. It is accordingly possible to provide a service infrastructure capable of achieving, in one stop, "the association of the communication device with the communication line," "device provisioning," and "the acquisition, the accumulation, and the visualization of the IoT data," which are required to analyze and visualize the data on the products to be deployed globally.

Moreover, the data distribution service infrastructure control server 101 is configured to determine the cloud service 120 being the communication destination of the communication device 150 by setting the communication adaptor 227 for communicating to/from the cloud service 120, and it is accordingly possible to select the cloud service 120 without complicated settings.

Moreover, the setting data (configuration file) set for the communication device 150 depends on the asset 160 connected to this communication device 150. The data distribution service infrastructure control server 101 is configured to search for the communication device 150 connected to the asset 160, and to output the information (URL (token)) for the retrieved communication device 150 to update the configuration file. It is accordingly possible to update the configuration file of the communication device 150 without considering the asset 160.

Moreover, the data distribution service infrastructure control server 101 is configured to hold the SIM-device association information 325 for managing the correspondence between the SIM and the communication device 150 and the device-asset association information 345 for managing the correspondence between the communication device 150 and the asset 160. When the SIM is replaced, the data distribution service infrastructure control server 101 is configured to update the information on the SIM in the SIM-device association information 325 without updating the device-asset association information 345. It is accordingly possible to update the SIM installed in the communication device 150 while maintaining the relationship between the communication device 150 and the asset 160.

Moreover, the data distribution service infrastructure control server 101 is configured to hold the SIM-device association information 325 for managing the correspondence between the SIM and the communication device 150 and the device-asset association information 345 for managing the correspondence between the communication device 150 and the asset 160. When the communication device 150 is replaced, the data distribution service infrastructure control server 101 is configured to update the information on the communication device 150 in the SIM-device association information 325 and the device-asset association information 345. It is accordingly possible to update the communication device 150 while maintaining the relationship between the SIM and the asset 160.

Moreover, the data distribution service infrastructure control server 101 is configured to output the display data (device list screen 800 and asset list screen 900) for displaying the correspondence among the SIM, the communication device 150, and the asset 160, and to provide the interface for specifying any one of the SIM, the communication device 150, and the asset 160 to update the specified element while maintaining the relationship with other elements. It is accordingly possible to change, with mobility, the relationship among the SIM, the communication device 150, and the asset 160.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. An IoT system, comprising:
   a communication device in which an identification module for controlling a communication requirement is installed, and which is configured to communicate to/from a cloud server;
   an asset which is connected to the communication device; and
   a control server which is configured to manage setting of communication between the communication device and the cloud server,
   wherein setting data set for the communication device depends on the asset connected to the communication device,
   wherein the control server is configured to:
   manage a relationship between the identification module and the communication device and a relationship between the communication device and the asset;
   set the communication between the communication device and the cloud server in order to transfer information from the asset to the cloud server, wherein the communication between the communication device and the cloud server is set by registering cloud service setting information with the control server, the cloud service setting information comprising a selected cloud operator and a selected cloud service plan, wherein the cloud server is provided by the selected cloud operator, and the selected cloud service plan is a plan selected from a plurality of available service plans provided by the selected cloud operator;
   search for the communication device connected to the asset by referring to a correspondence between the communication device and the asset tracked in the control server;
   output information for the communication device to update the setting data; and
   determine the cloud server being a communication destination of the communication device by setting a communication adaptor for communicating to/from the cloud server in accordance with the cloud service setting information, wherein the communication adaptor is a part of the control server,
   wherein the selected cloud operator and the selected cloud service plan are selected through the control server.

2. The IoT system according to claim 1, wherein the control server is configured to:
   hold module-device association information for managing a correspondence between the identification module and the communication device and device-asset association information for managing a correspondence between the communication device and the asset; and
   update information on the identification module in the module-device association information without updating the device-asset association information when the identification module is replaced.

3. The IoT system according to claim 1, wherein the control server is configured to:
   hold module-device association information for managing a correspondence between the identification module and the communication device and device-asset association information for managing a correspondence between the communication device and the asset; and
   update information on the communication device in the module-device association information and the device-asset association information when the communication device is replaced.

4. The IoT system according to claim 1, wherein the control server is configured to:
   output display data for displaying a correspondence among the identification module, the communication device, and the asset; and
   provide an interface for specifying any one of the identification module, the communication device, and the asset to update specified element including at least one of the identification module, the communication device, and the asset while maintaining a relationship with other elements including at least one of the identification module, the communication device, and the asset.

5. A data collection control method for controlling data collection in an IoT system, the IoT system including a communication device in which an identification module for controlling a communication requirement is installed, and which is configured to communicate to/from a cloud server, an asset which is connected to the communication device, and a control server which is configured to manage setting of communication between the communication device and the cloud server, setting data set for the communication device depends on the asset connected to the communication device, the data collection control method comprising:
- managing, by the control server, a relationship between the identification module and the communication device and a relationship between the communication device and the asset;
- setting, by the control server, the communication between the communication device and the cloud server in order to transfer information from the asset to the cloud server, wherein the communication between the communication device and the cloud server is set by registering cloud service setting information with the control server, the cloud service setting information comprising a selected cloud operator and a selected cloud service plan, wherein the cloud server is provided by the selected cloud operator, and the selected cloud service plan is a plan selected from a plurality of available service plans provided by the selected cloud operator;
- searching, by the control server, for the communication device connected to the asset by referring to a correspondence between the communication device and the asset tracked in the control server;
- outputting, by the control server, information for the communication device to update the setting data; and
- determining, by the control server, the cloud server being a communication destination of the communication device by setting a communication adaptor for communicating to/from with the cloud server in accordance with the cloud service setting information, wherein the communication adaptor is a part of the control server,
- wherein the selected cloud operator and the selected cloud service plan are selected through the control server.

6. The data collection control method according to claim 5, further comprising:
- holding, by the control server, module-device association information for managing a correspondence between the identification module and the communication device and device-asset association information for managing a correspondence between the communication device and the asset; and
- updating, by the control server, information on the identification module in the module-device association information without updating the device-asset association information when the identification module is replaced.

7. The data collection control method according to claim 5, further comprising:
- holding, by the control server, module-device association information for managing a correspondence between the identification module and the communication device and device-asset association information for managing a correspondence between the communication device and the asset; and
- updating, by the control server, information on the communication device in the module-device association information and the device-asset association information when the communication device is replaced.

8. The data collection control method according to claim 5, further comprising:
- outputting, by the control server, display data for displaying a correspondence among the identification module, the communication device, and the asset; and
- providing, by the control server, an interface for specifying any one of the identification module, the communication device, and the asset to update specified element including at least one of the identification module, the communication device, and the asset while maintaining a relationship with other elements including at least one of the identification module, the communication device, and the asset.

* * * * *